(12) United States Patent
Kerr

(10) Patent No.: US 7,188,719 B2
(45) Date of Patent: Mar. 13, 2007

(54) ALL GEAR INFINITELY VARIABLE TRANSMISSION

(75) Inventor: John Hugh Kerr, Kingston (CA)

(73) Assignee: Ker-Train Holdings, Ltd., Kingston (CA)

( * ) Notice: Subject to any disclaimer, the term of this patent is extended or adjusted under 35 U.S.C. 154(b) by 0 days.

(21) Appl. No.: 10/910,181

(22) Filed: Aug. 3, 2004

(65) Prior Publication Data

US 2005/0009661 A1  Jan. 13, 2005

Related U.S. Application Data

(62) Division of application No. 09/807,634, filed as application No. PCT/CA99/00951 on Oct. 15, 1999, now Pat. No. 6,849,023.

(60) Provisional application No. 60/104,477, filed on Oct. 16, 1998.

(51) Int. Cl.
*F16D 13/24* (2006.01)
*F16H 35/00* (2006.01)

(52) U.S. Cl. ................. 192/65; 192/66.2; 192/93 A

(58) Field of Classification Search ............ 192/65, 192/66.2, 66.21
See application file for complete search history.

(56) References Cited

U.S. PATENT DOCUMENTS

| | | | |
|---|---|---|---|
| 1,409,900 A | | 3/1922 | Adams |
| 1,494,726 A | | 5/1924 | Weiss |
| 1,834,843 A | * | 12/1931 | Humfrey ............. 192/45 |
| 1,955,879 A | * | 4/1934 | Griswold ............ 192/65 |
| 2,142,700 A | | 1/1939 | Simonds |
| 2,239,313 A | | 4/1941 | Beschkine |
| 2,378,967 A | | 6/1945 | Andrew |

(Continued)

FOREIGN PATENT DOCUMENTS

FR  2 546 598  5/1983

(Continued)

*Primary Examiner*—Rodney H. Bonck
(74) *Attorney, Agent, or Firm*—Clark Hill PLC

(57) ABSTRACT

An infinitely-variable transmission consists of a rotational input member, a rotational output member, first and second non-circular driving gears coupled to one of the rotational members, and a plurality of variable velocity-ratio gear assemblies disposed about the one rotational member. Each gear assembly comprises an intermediate shaft including first and second non-circular driven gears respectively meshing with the first and second non-circular driving gears. Each gear assembly also comprises a multi-directional coupling associated with the pair of first driven/driving gears and the pair of second driven/driving gears, and an actuator associated with the coupling for coupling the first and second variable-ratio gear pairs to the rotational members. Preferably, the variable-ratio gear pairs for each gear assembly are coupled to the rotational members over an angular duration when the velocity ratios of both the variable-ratio gear pairs of the respective gear assembly are changing linearly so as to provide a uniform velocity ratio over that angular duration. Further, preferably the occurrences of these angular durations for each of the gear assemblies overlap or are at least coterminous so as to provide a continuously uniform velocity ratio between the rotational members. The transmission also includes a phase angle variator associated with the variable-ratio gear pairs for varying the rotational angular displacement between the first gear pairs and the second gear pairs of each gear assembly so as to vary the velocity ratio of the transmission as needed.

5 Claims, 38 Drawing Sheets

U.S. PATENT DOCUMENTS

| | | |
|---|---|---|
| 2,439,079 A | 4/1948 | Davidson |
| 2,493,418 A | 1/1950 | Orshansky, Jr. |
| 2,978,918 A | 4/1961 | Pollitt |
| 3,424,021 A | 1/1969 | Fruedenstein |
| 3,473,414 A | 10/1969 | Shachter |
| 3,721,131 A | 3/1973 | Ingham |
| 3,919,895 A | 11/1975 | Kerr |
| 4,341,294 A * | 7/1982 | Kerr ............................ 192/45 |
| 4,685,348 A | 8/1987 | Takami |
| 4,765,195 A | 8/1988 | Takami |
| 4,788,891 A | 12/1988 | Katori |
| 4,944,718 A | 7/1990 | Takahara et al. |
| 4,969,860 A | 11/1990 | Takami et al. |
| 5,109,964 A * | 5/1992 | Fukui et al. .............. 192/48.92 |
| 5,201,690 A | 4/1993 | Dooner et al. |
| 5,226,859 A | 7/1993 | Pires |
| 5,251,507 A | 10/1993 | Takahara et al. |
| 5,334,115 A | 8/1994 | Pires |
| 5,720,371 A * | 2/1998 | Kimura et al. ................. 192/38 |
| 6,135,255 A * | 10/2000 | Myers ......................... 192/45 |
| 6,409,001 B1 * | 6/2002 | Kerr ........................... 192/44 |
| 6,446,776 B1 * | 9/2002 | Kerr ........................... 192/44 |
| 6,684,992 B2 * | 2/2004 | Goto et al. ................... 192/38 |
| 6,849,023 B1 * | 2/2005 | Kerr ........................... 475/302 |

FOREIGN PATENT DOCUMENTS

| | | |
|---|---|---|
| GB | 374547 | 3/1931 |
| GB | 732319 | 7/1953 |
| GB | 2 310 745 | 9/1997 |
| WO | WO 88/02081 | 3/1988 |
| WO | WO 98/49465 | 11/1998 |
| WO | WO 99/28645 | 6/1999 |

* cited by examiner

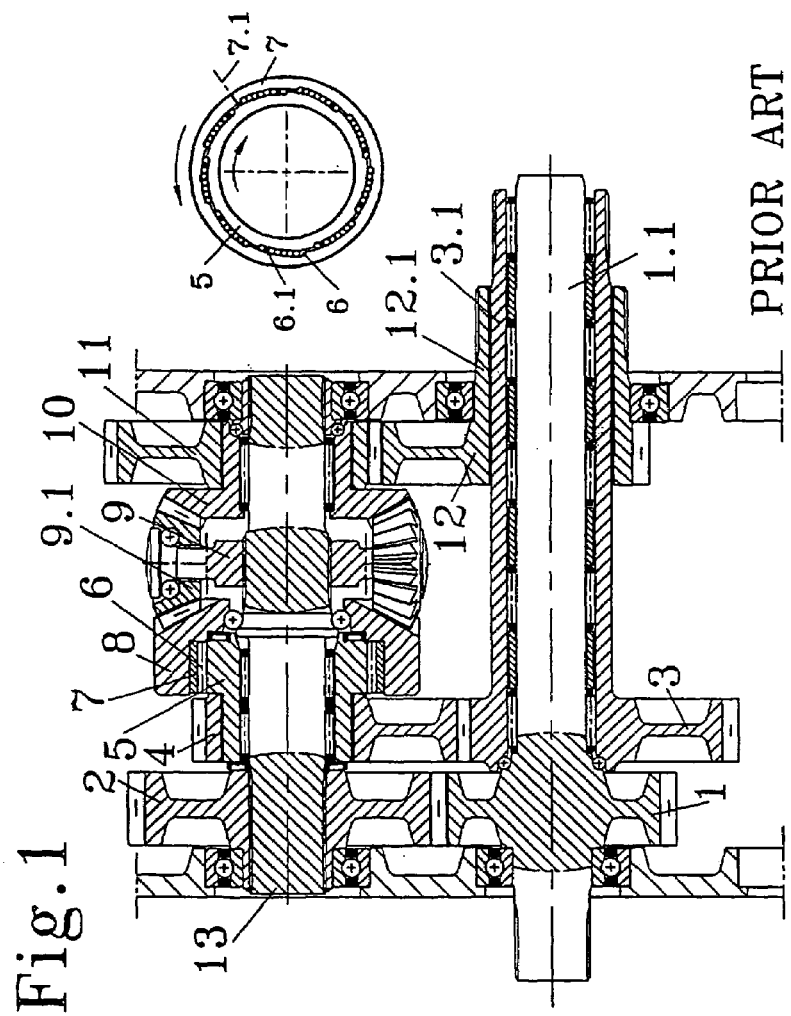

PRIOR ART

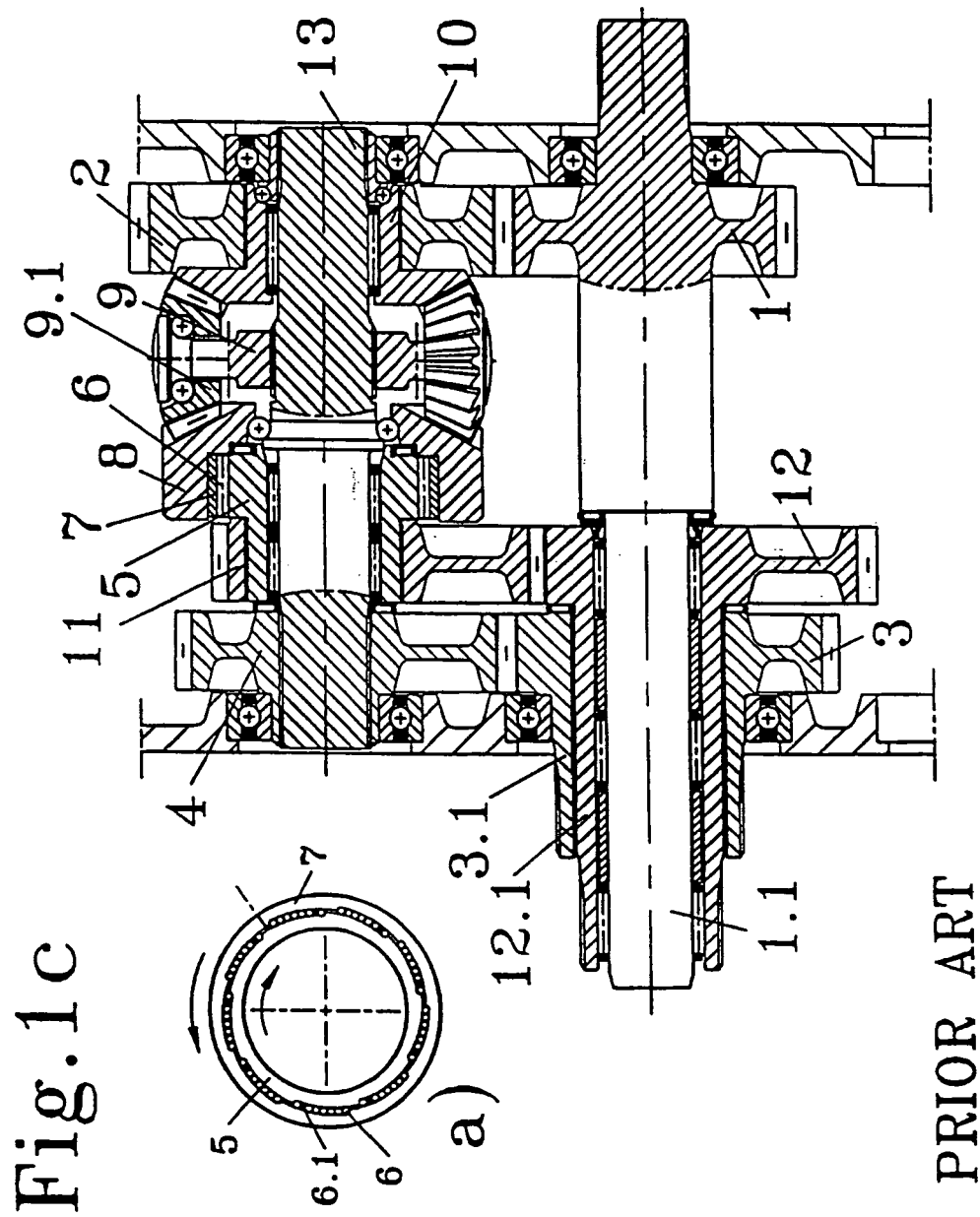

PRIOR ART

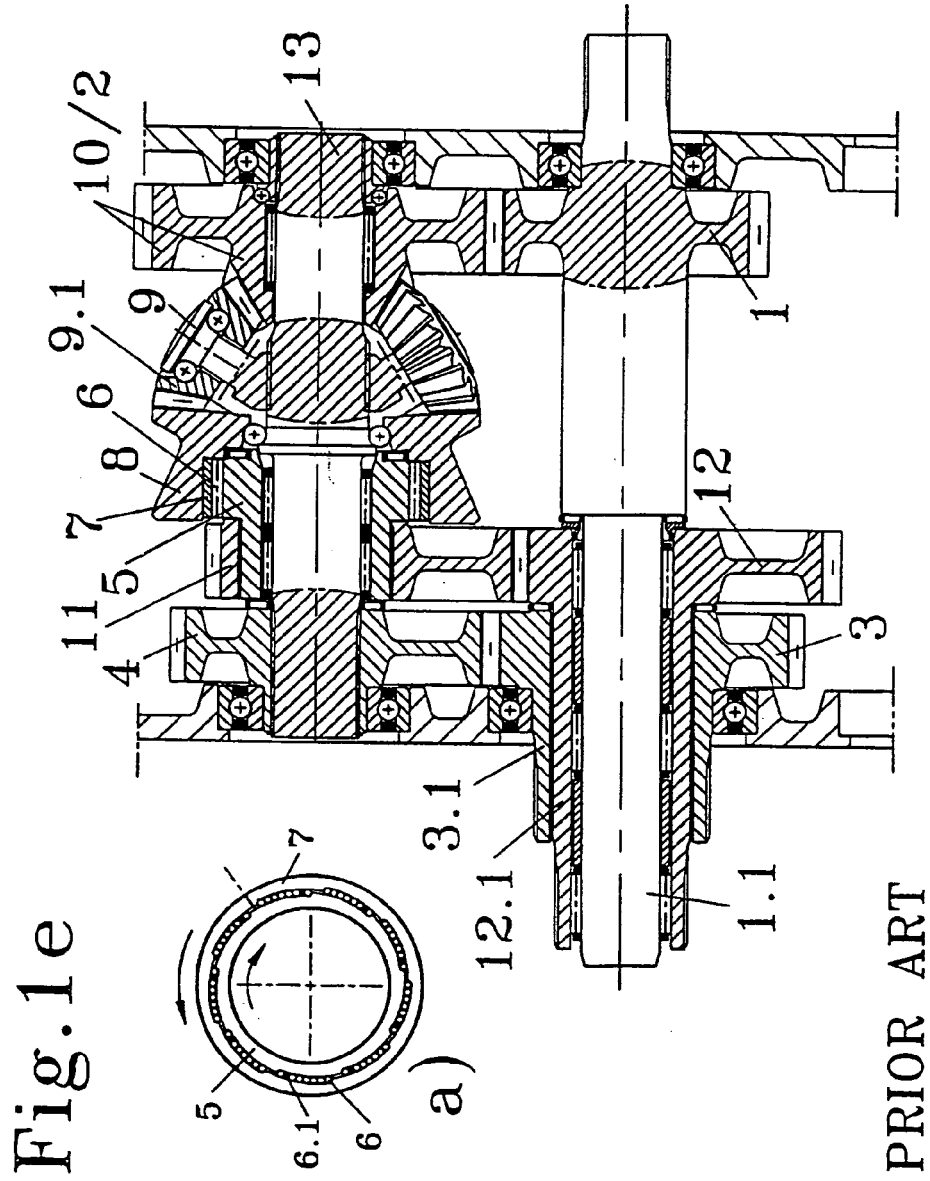

Fig.1f
1. 2.
1) 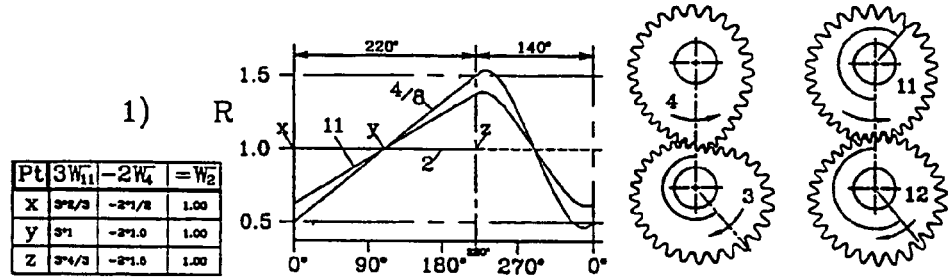
2) 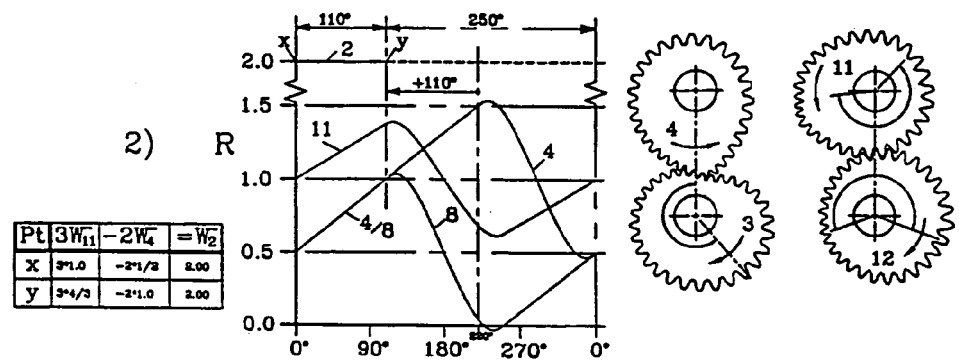
3) 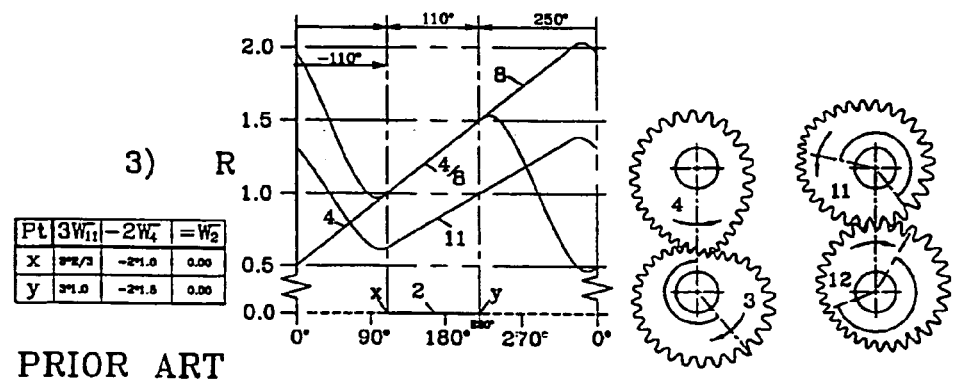
PRIOR ART

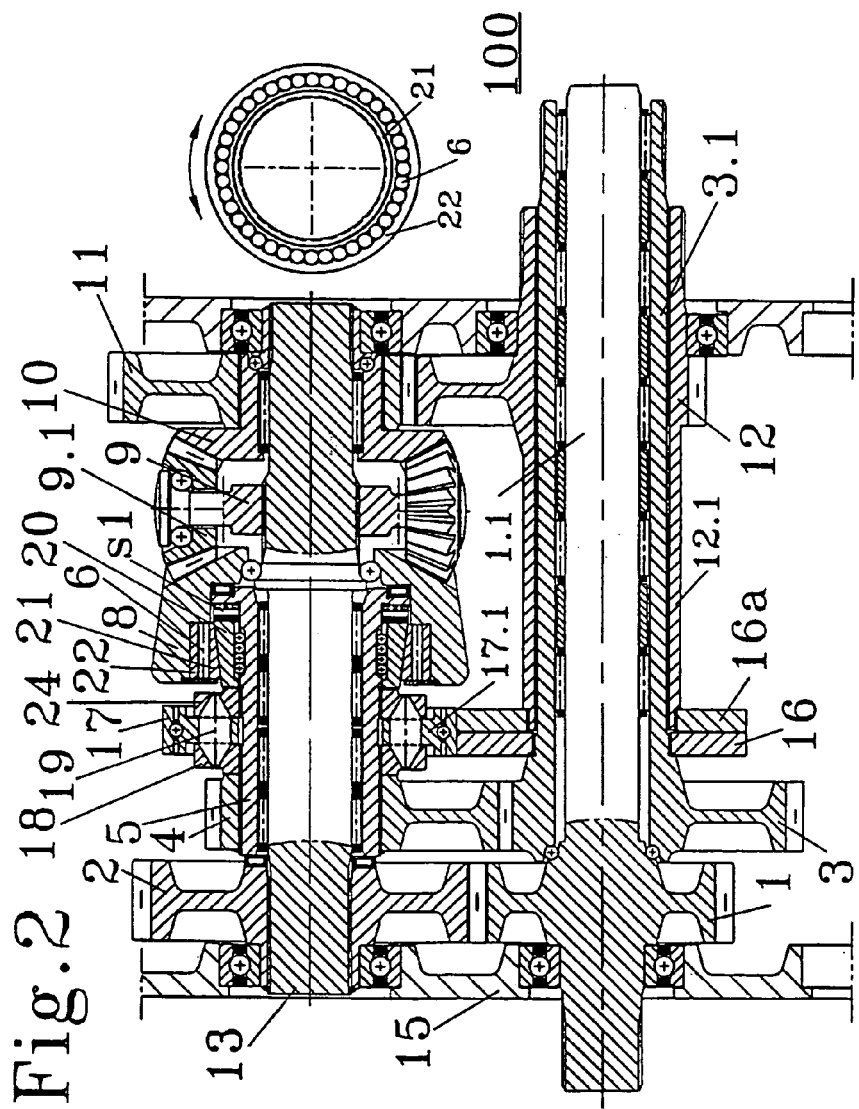

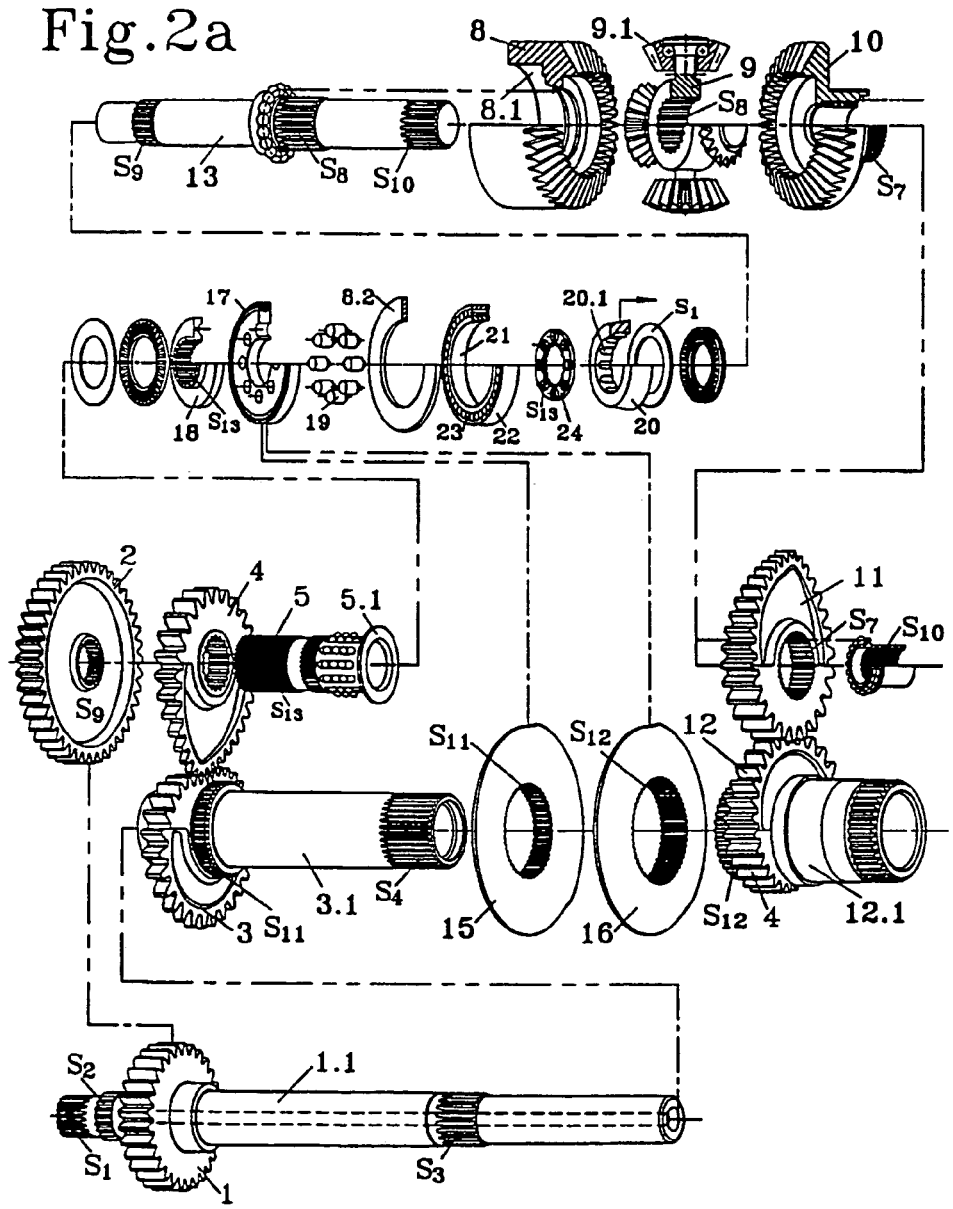

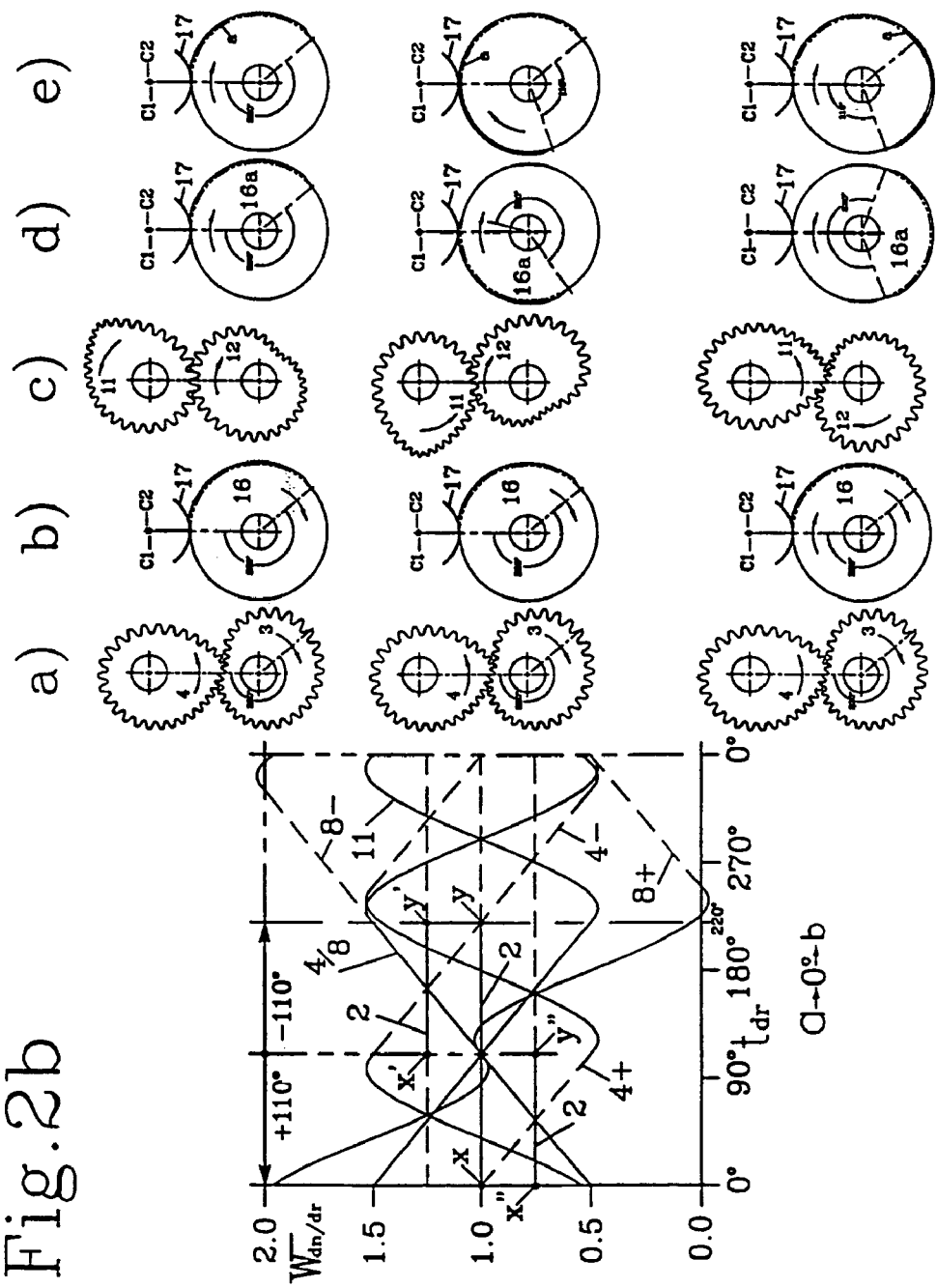

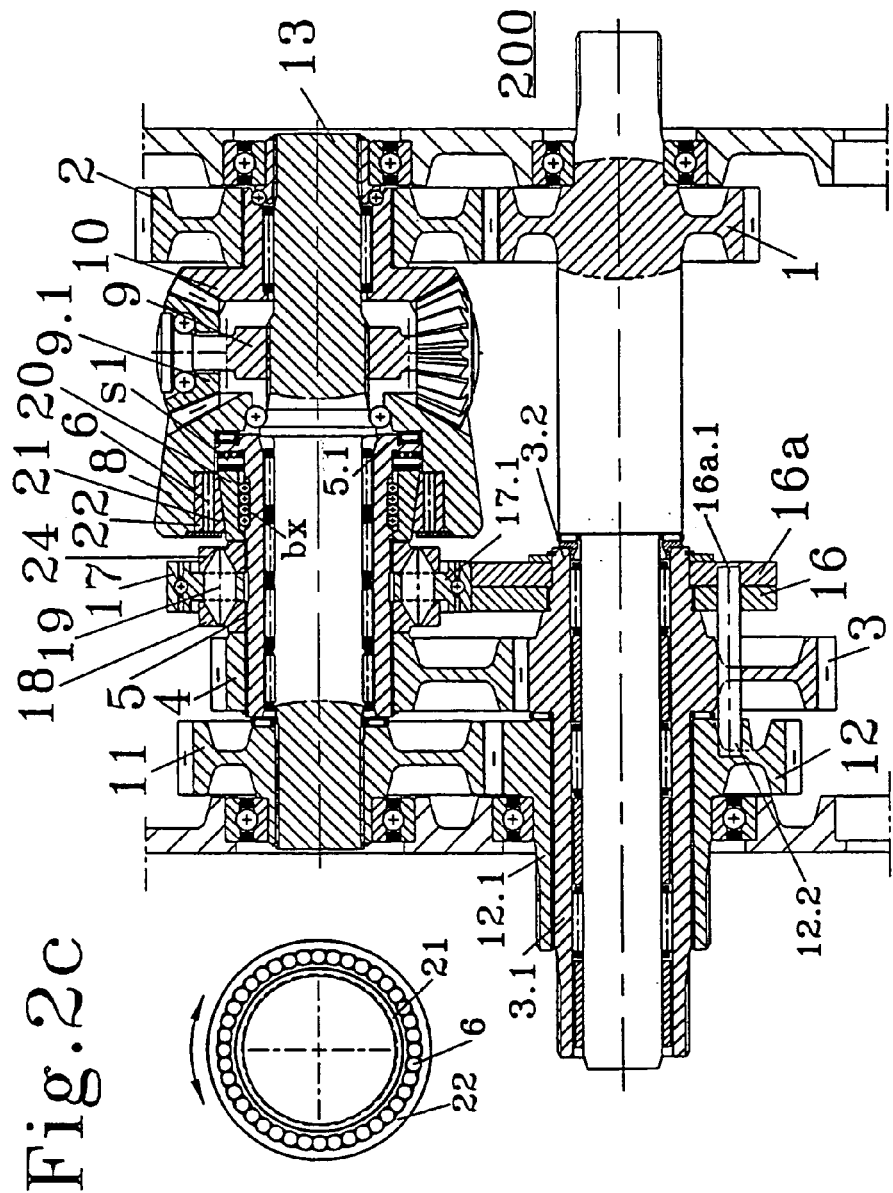

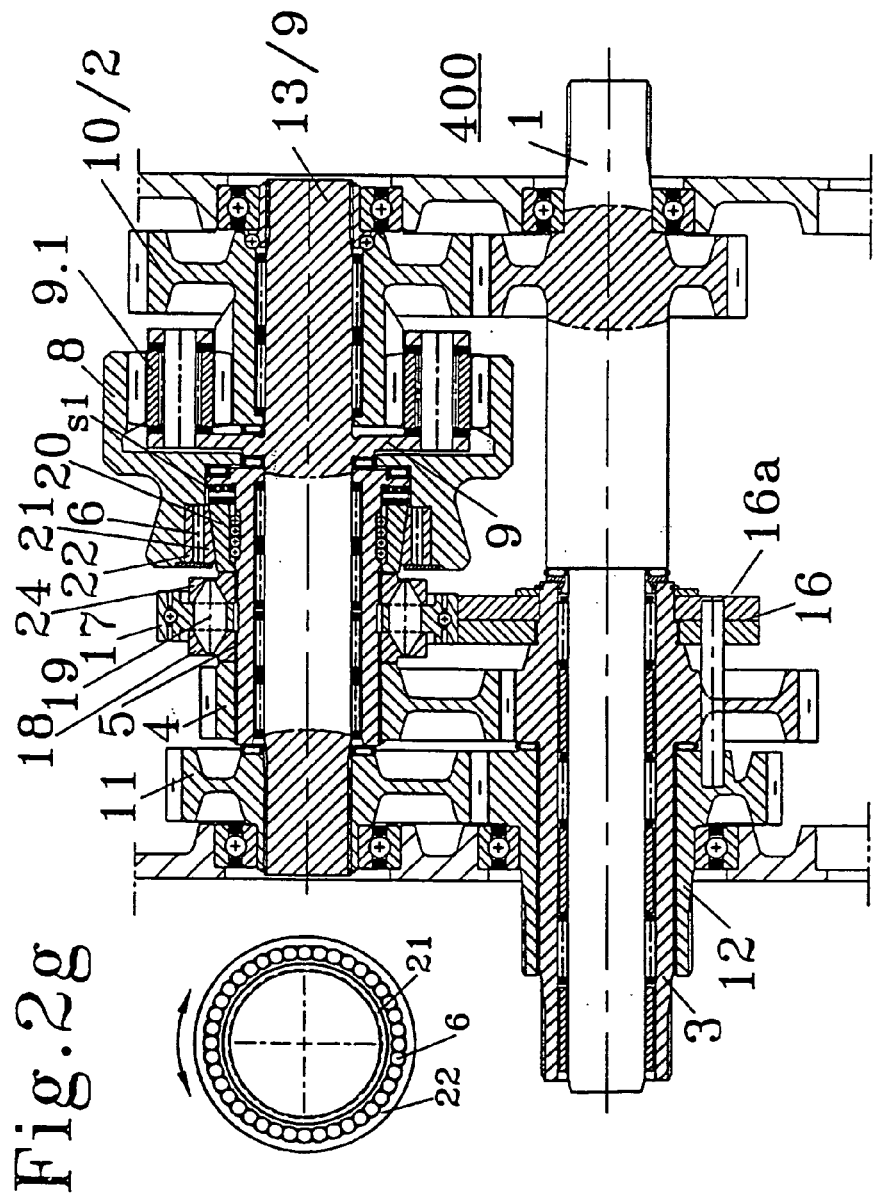

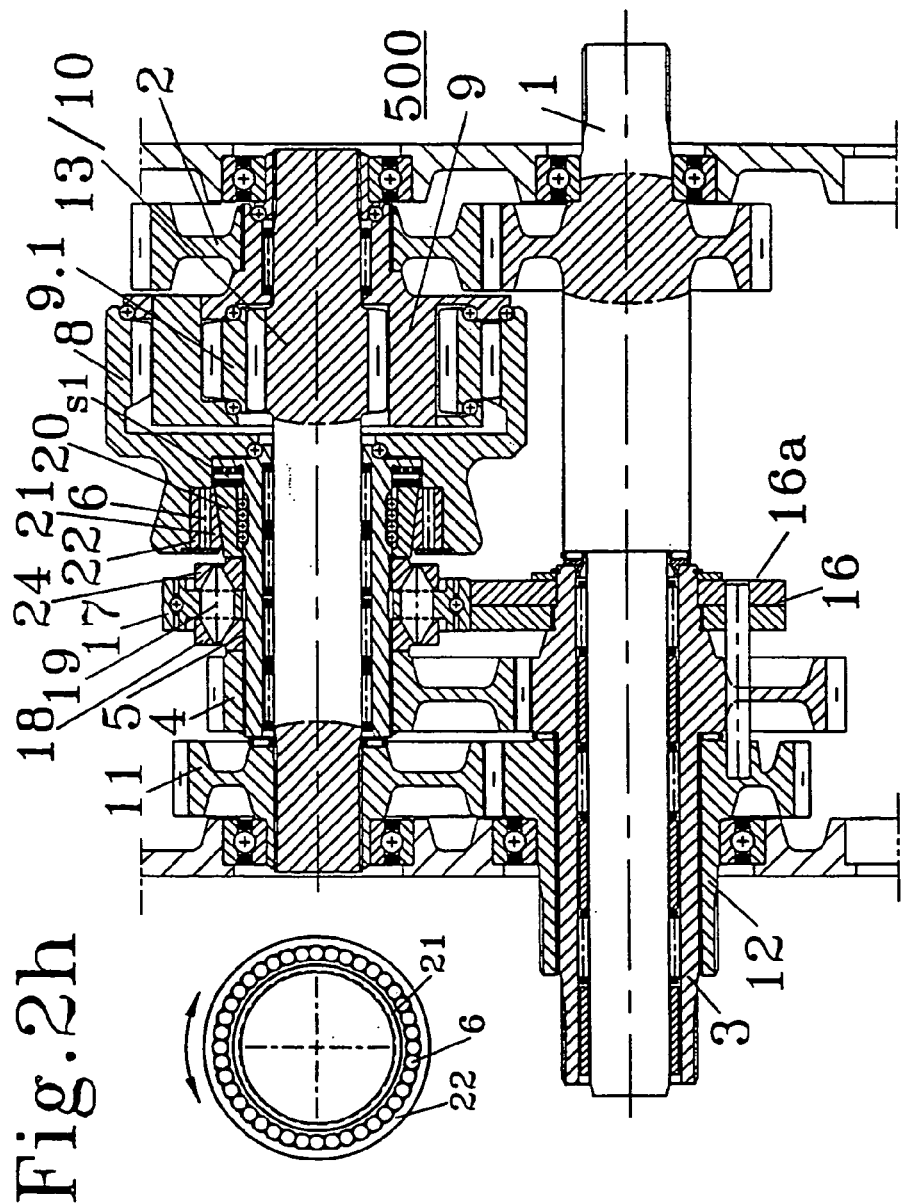

Fig.4a
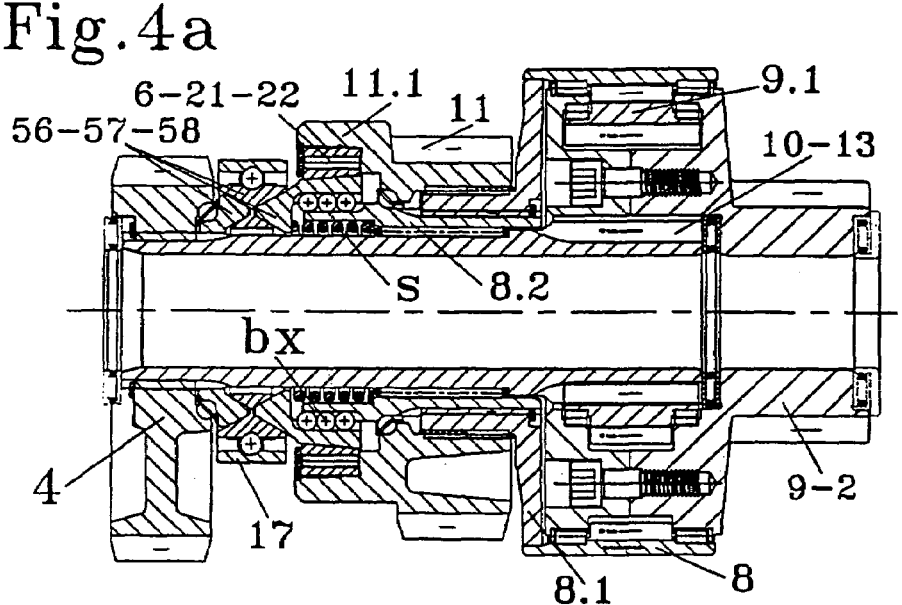
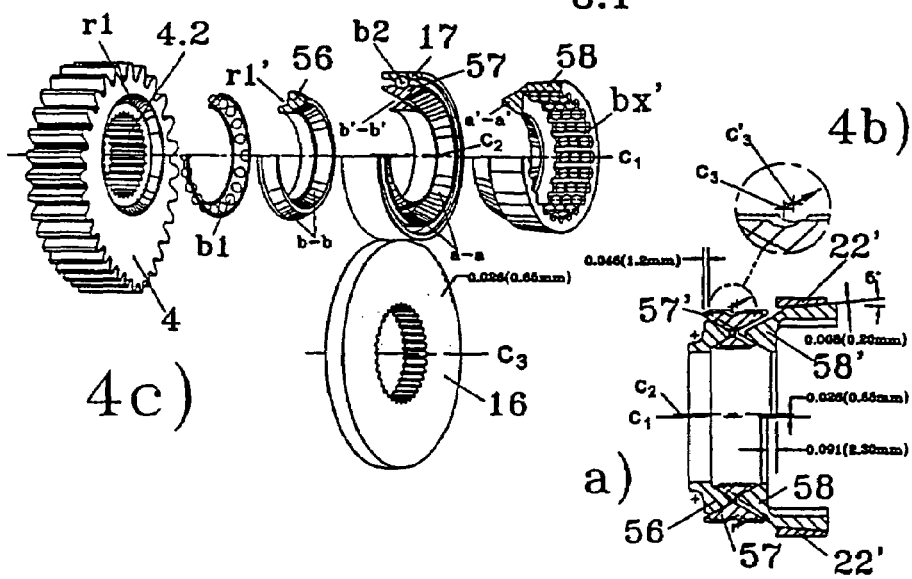

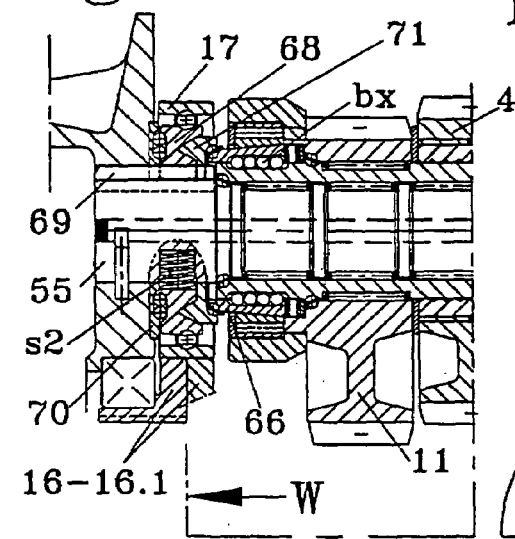
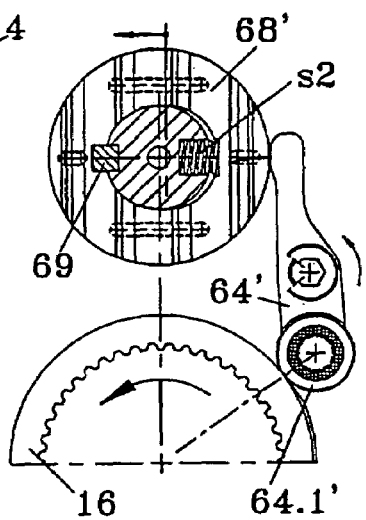
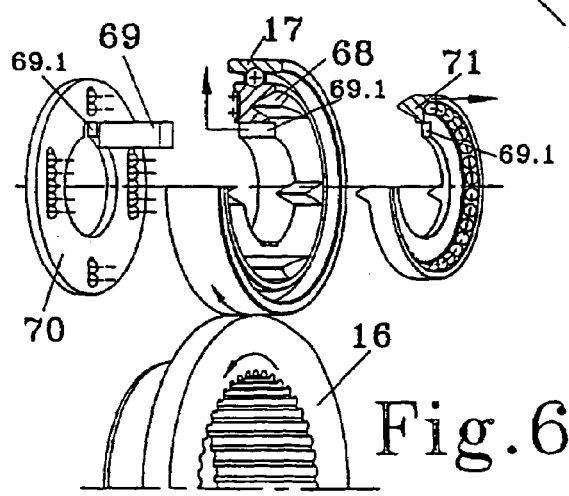

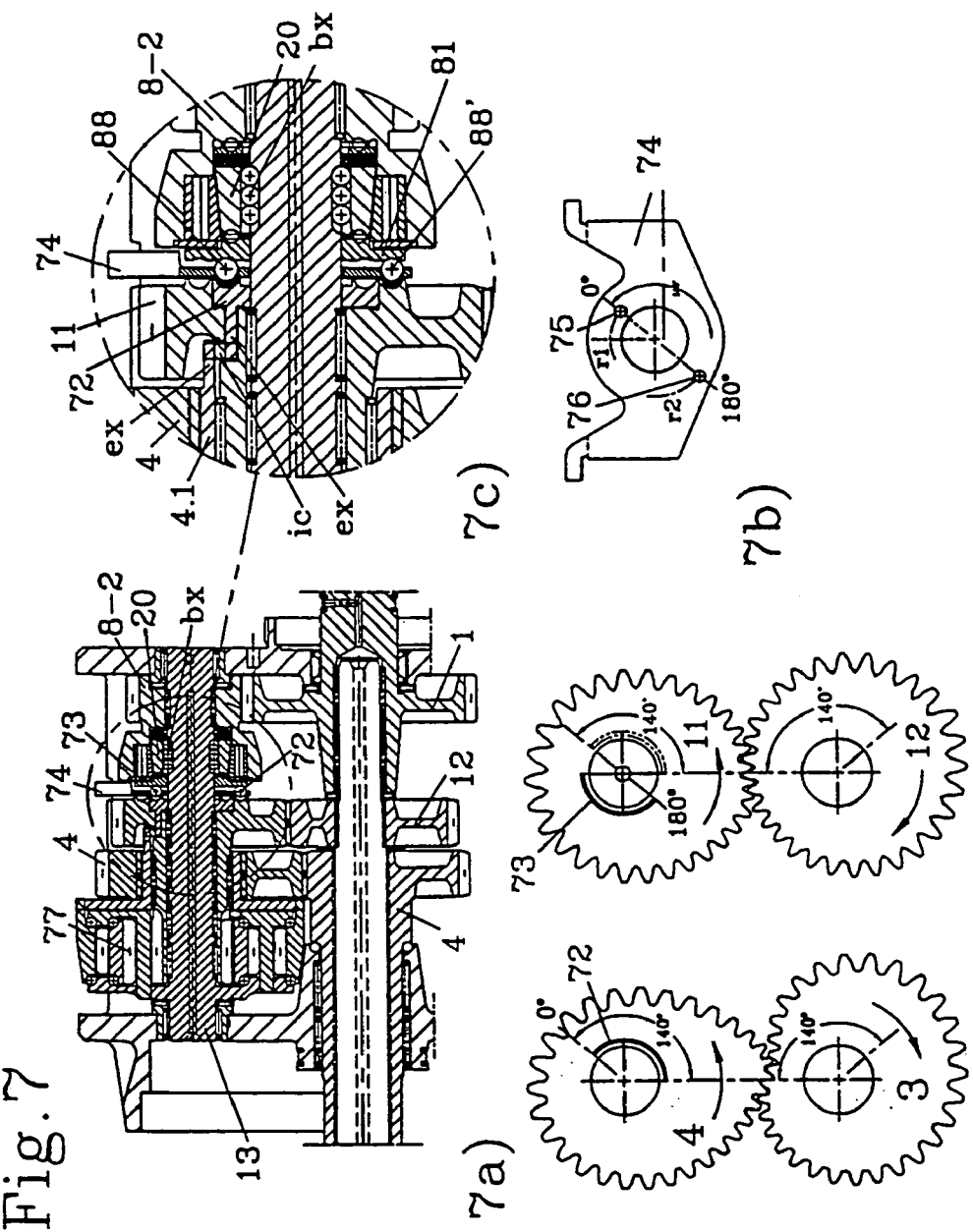

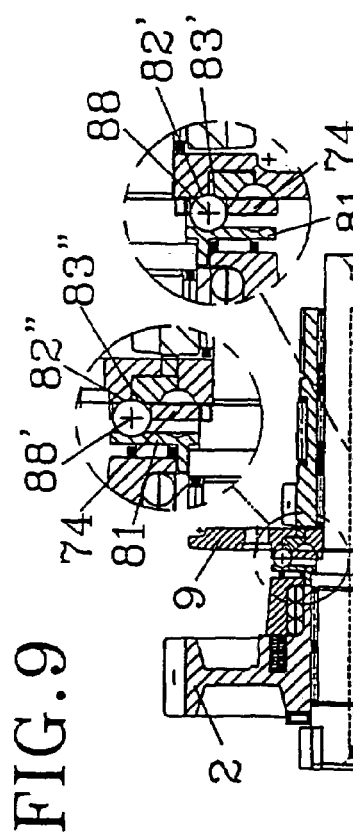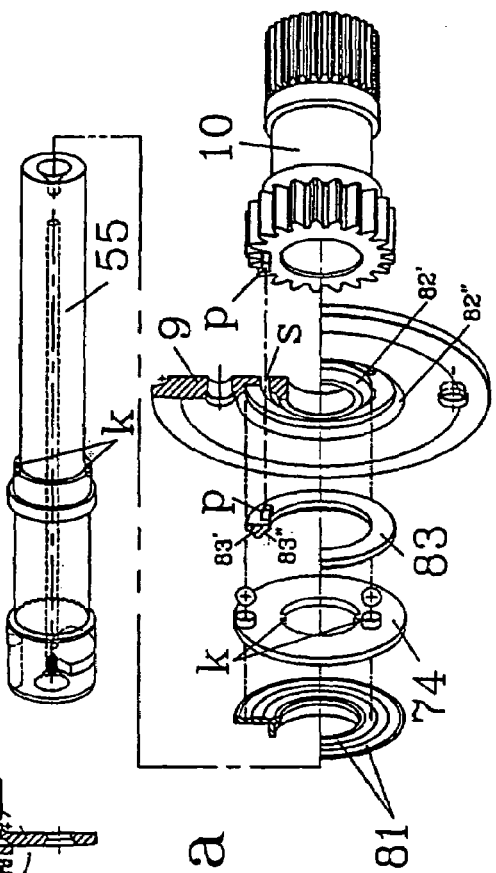
FIG.9
Fig.9a

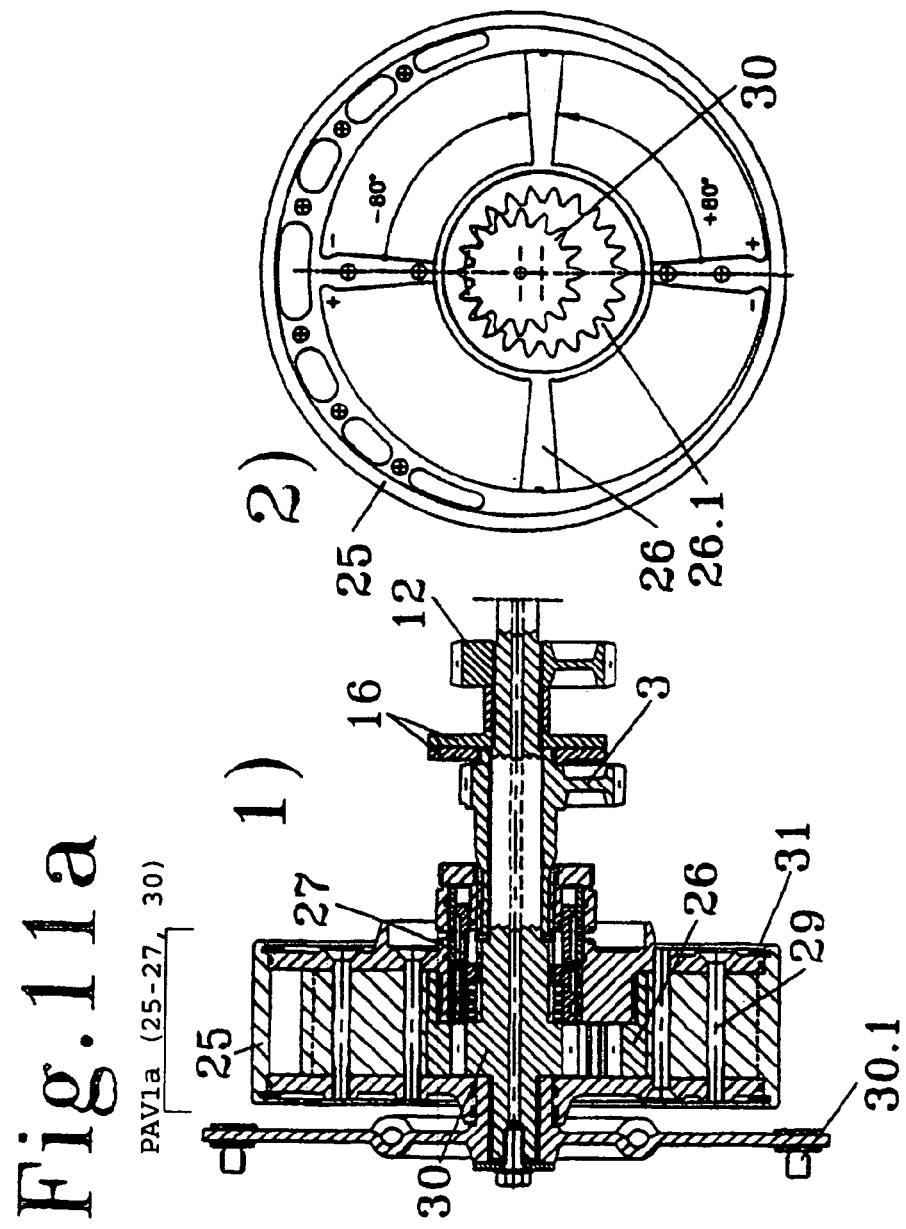

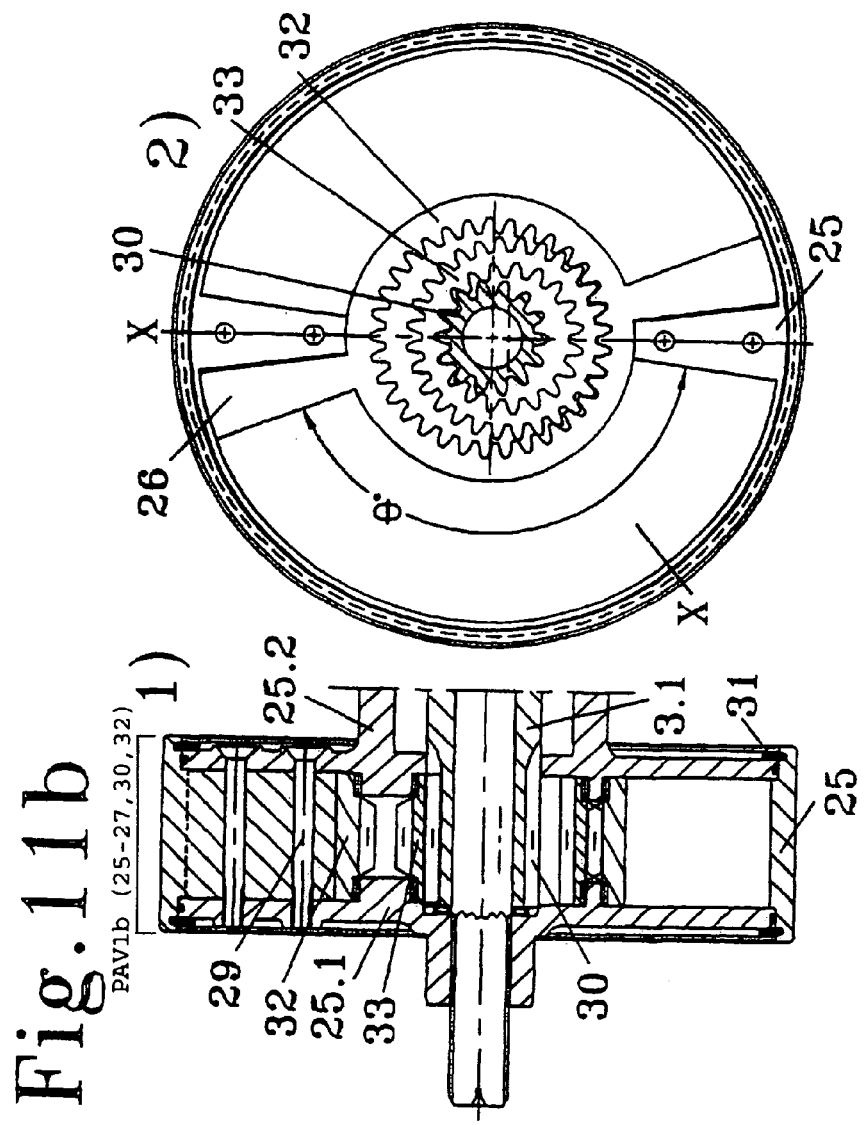

PAV3 (96,97,98,99)

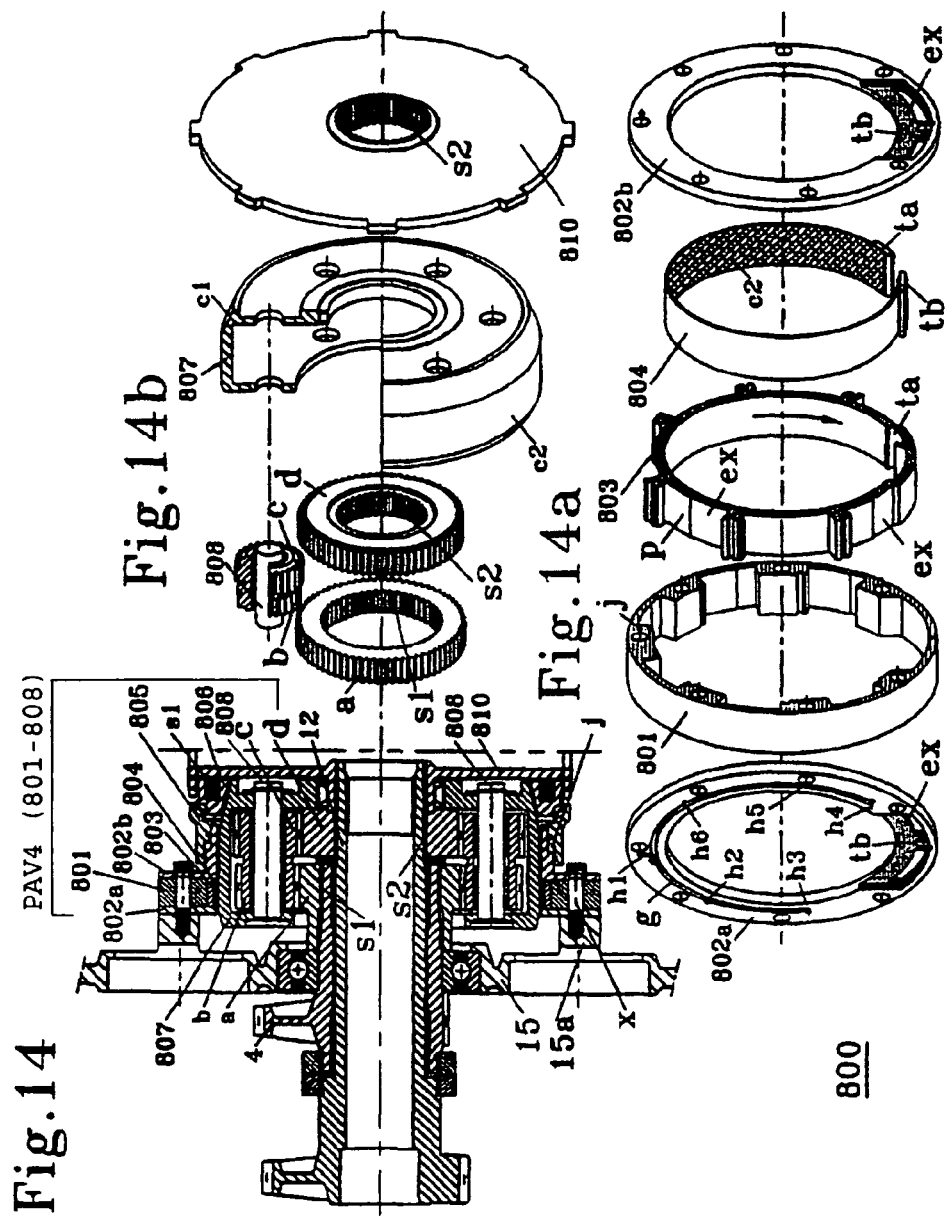

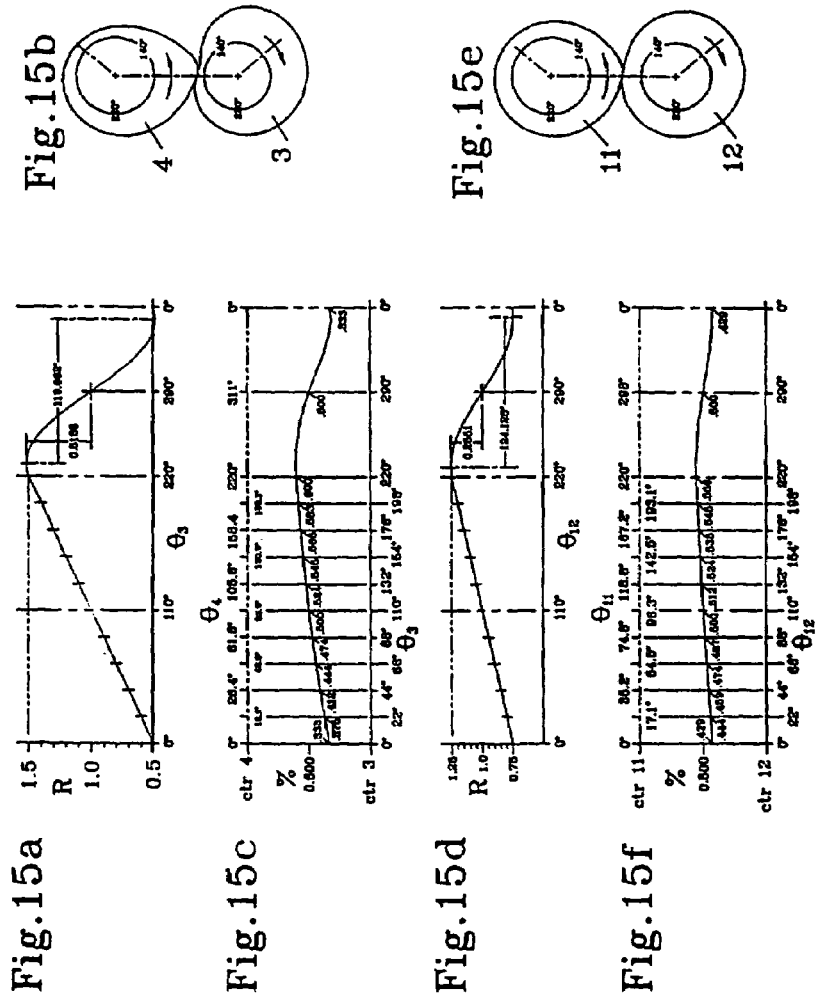

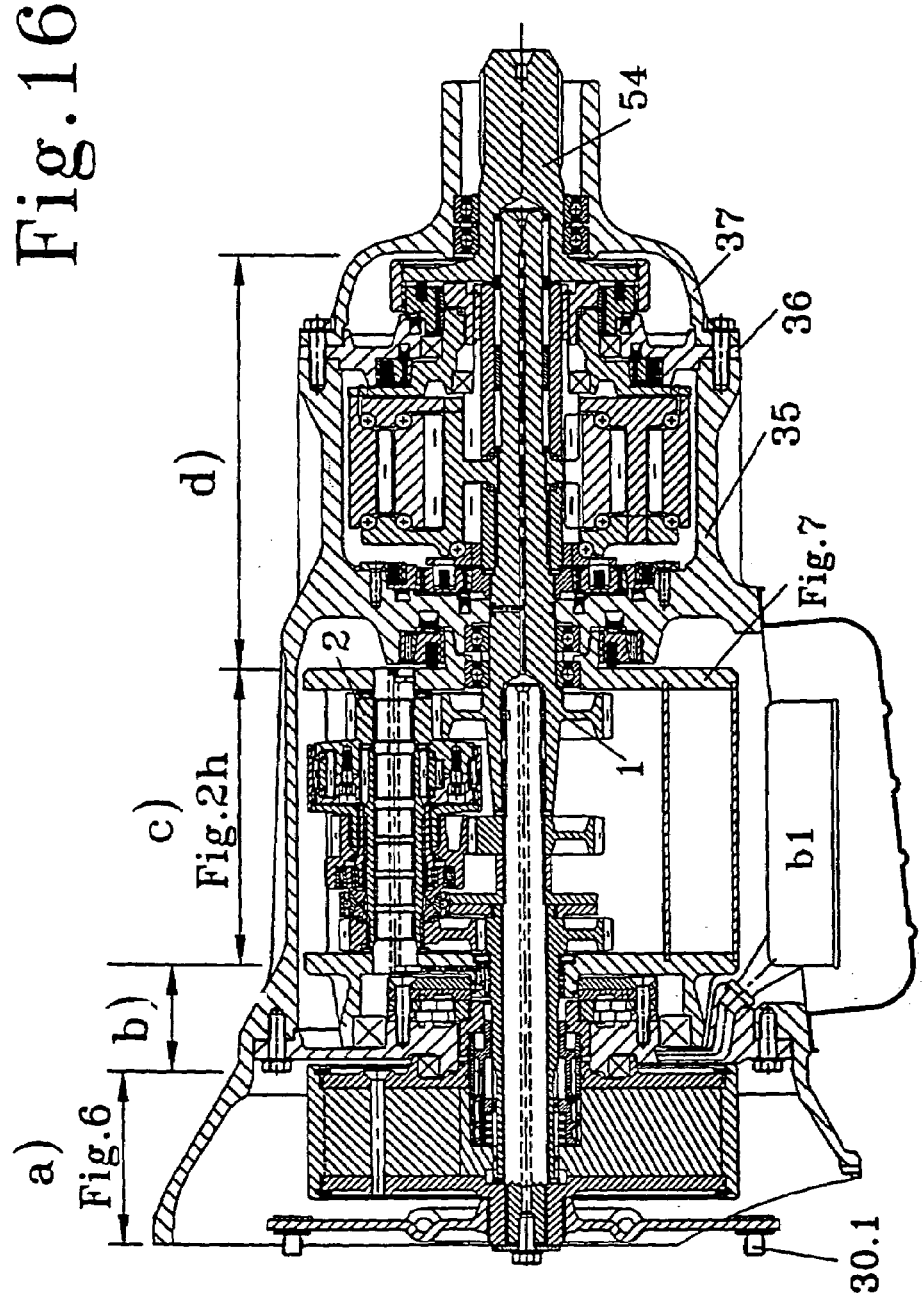

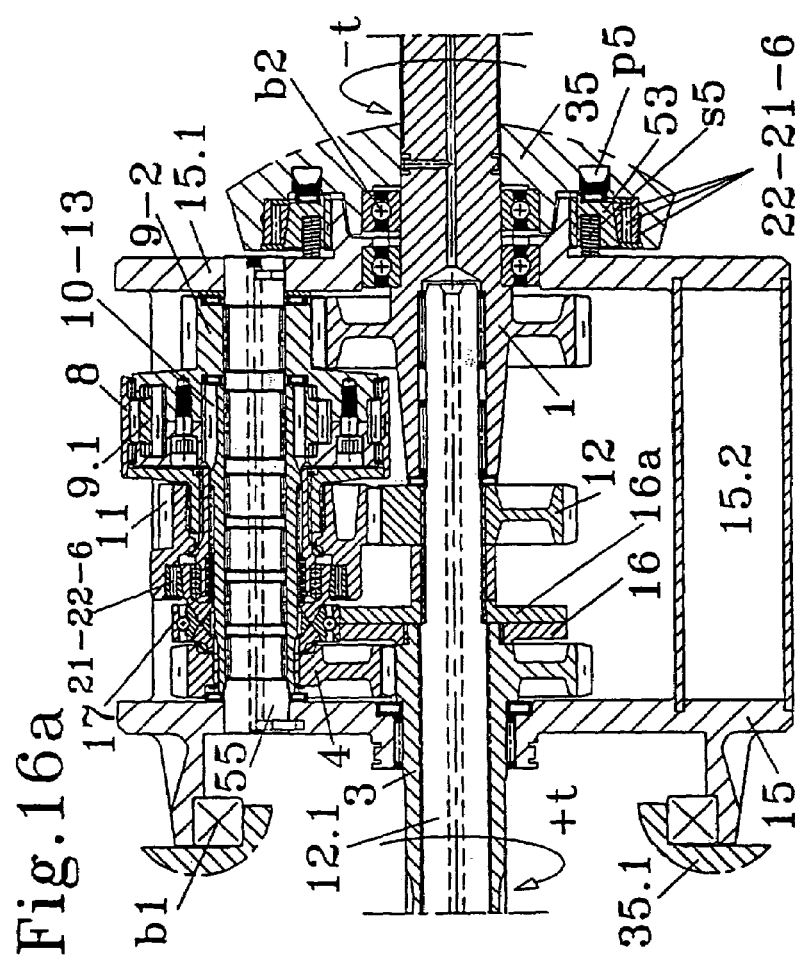

ALL GEAR INFINITELY VARIABLE TRANSMISSION

This application is a divisional application of and claims priority from U.S. patent application Ser. No. 09/807,634, filed on Apr. 16, 2001 and now U.S. Pat. No. 6,849,023, which is a 35 U.S.C. 371 national stage of PCT/CA99/00951, filed on Oct. 15, 1999, which claims priority from U.S. provisional patent application Ser. No. 60/104,477, filed on Oct. 16, 1998.

FIELD OF THE INVENTION

The present invention relates to gear systems having variable velocity ratios. In particular, the present invention relates to all-gear transmissions whose velocity ratios may be varied continuously over the velocity ratio continuum.

BACKGROUND OF THE INVENTION

The conventional transmission incorporates a number of planetary gears which are selectively coupled between the input and output shafts for changing the velocity ratio of the transmission. However, the conventional transmission results in an inefficient transfer of torque between the input and output shafts since the prime mover must be uncoupled from the transmission output shaft while the planetary gears are switched. Further, since engine speed must vary in each gear ratio to affect speed change of the output shaft, the efficiency of the engine cannot be maximized for any particular operating condition. Therefore, many attempts have been made to provide a transmission whose velocity ratios are infinitely variable over the velocity ratio continuum.

For instance, Beschkine (U.S. Pat. No. 2,239,313) teaches a gear system incorporating continuously-meshing non-circular gears. As shown in FIG. 3 of the patent, the gear system comprises a driving shaft P including a plurality of non-circular gears 1, 2, 3, 4, and a driven shaft R parallel to the driven shaft P including a plurality of non-circular gears, 1', 2', 3', 4' meshing with the gears 1, 2, 3, 4. The driven gears 1', 2', 3', 4' are coupled successively to the driven shaft R by electromagnetic clutches for a respective portion of the interval of revolution of the driven shaft R so that the velocity ratio of the gear system is dependent upon the gear ratios of the gears 1–1', 2–2', 3–3', 4–4' over their respective coupling intervals. Consequently, the velocity ratio of the gear system is varied by simply changing the angular position of the gears 1', 2', 3', 4' during their coupling intervals. However, as the clutches must be activated each revolution of the driven shaft R, the clutches must be relatively small to be used for high speed applications, thereby limiting the torque which can be carried by the gear system.

Kerr(Canadian Patents 990,103; 1,000,526; 1,031,190; U.S. Pat. Nos. 3,919,895: 4,055,091) teaches variable output transmission incorporating square-wave generators for facilitating changes to the velocity ratio. Each transmission comprises a pair of non-circular driving gears coupled to an input shaft, and a pair of non-circular driven gears which continuously mesh with the driven gears. The velocity ratio profile of each non-circular gear pair resembles a triangular or saw-tooth wave. The rotational outputs of the two non-circular gear pairs are combined-through a differential to provide a differential output having a square-wave velocity ratio profile. The differential outputs of a number of such differentials are combined together through one-way over-running clutches to a provide a velocity ratio which is infinitely variable in accordance with the relative angular displacement of the driving gears. The variable output transmissions taught by Kerr represented a significant advance over the prior art. However. overrunning clutches can only transfer energy in a single direction, thereby precluding engine drag. Further, as the variable output transmissions only amplified the positive or negative periods of the square-wave velocity ratio profile, the efficiency and maximum kinematic range of the transmissions was limited.

Takahara (U.S. Pat. No. 4,944,718) teaches an angular velocity modulating device which, as shown in FIGS. 1 to 3 of the patent comprises a first rotatable shaft 24 rotatably coupled to a stationary first frame 61; non-circular internal gears 11 mounted on the first shaft 24; a second parallel shaft 34 rotatably mounted on a rotatable second frame 62; second non-circular gears 21 meshing with the first non-circular gears 11 and fixed on the parallel second shaft 24; third non-circular gears 31 meshing with the first non-circular gears 11 and mounted on the parallel third shaft 34 through an overrunning clutch 37; an input shaft 44 including a circular gear 27 for rotating the second shaft 24; and an output shaft 54 including a circular gear 54 driven by the third shaft 34. Since the velocity ratio of the device is varied by changing the angular displacement of the second frame 62 relative to the first frame 61, rapid changes in velocity ratio would be difficult to attain since the angular displacement of the second frame 62 could only be changed by also moving the second shaft 34 and the mass of the accompanying non-circular gears 34. Further, as discussed above, the overrunning clutches preclude engine drag and reduce the efficiency and maximum kinematic range of the device.

Recently, Pires (U.S. Pat. Nos. 5,226,859; 5,334,115) disclosed an infinitely variable transmission which eliminates the need for overrunning clutches. As shown in FIGS. 2, 3 and 4 of the '859 patent, the transmission comprises an input shaft 5, a planetary rotor 29 connected to the input shaft 5 through a front plate 5', a first pair of crank arms 8a, 8c rotatably coupled to the planetary rotor 29, a second pair of crank arms 9b, 9d rotatably coupled to the planetary rotor 29, and an index plate 7 which incorporates slots for receiving an end of the crank arms. The index plate 7 is supported on an index slide 6 which allows the index plate to move laterally of the shaft 5. The transmission also includes four planar differential gear sets, each set comprising an internally-toothed ring gear 12 coupled to one of the crank arms, a pair of pinions 14 meshing with the ring gear 12, and a sun gear 15 meshing with the pinions 14. The sun gear 15 of each differential gear set is connected to a reaction gear 16 which meshes with an internally-toothed stationary commutator gear 28.

In operation, when the input shaft 5 rotates, the planetary rotor 29 is forced to rotate, causing the crank arms to drive the index plate 7 about its own axis of rotation, as defined by the index slide 6. If the index plate 7 is eccentric to the axis of the planetary rotor 29, the crank arms oscillate about their own axes while orbiting the planetary rotor 29. The amplitude of oscillations is a function of the eccentricity of the index plate 7. The rotational oscillations are delivered to the differential gear sets by the ring gears 12. As shown in FIG. 7 of the patent, the commutator gear 28 includes teeth only around half of the inner circumference of the gear, so that the reaction gears 16 rotate freely one half of a rotational cycle of the input shaft 5. Consequently, when the "desired" polarity of oscillation is present at the crank arm, the commutator gear 28 provides a supplemental rotational input to the differential, whereas when the "undesired"

polarity of oscillation is present, the commutator gear 28 prevents the oscillation from reducing the output of the transmission.

Although the transmission taught by Pires addresses the problems imposed by overrunning clutches on efficiency and kinematic range, the transmission is quite complex. Further, it is believed that the oscillating crank arms will produce undesirable fluctuations in the velocity ratio of the transmission. Accordingly, there remains a need for an infinitely-variable all gear transmission which has an enhanced kinematic range, is capable of making rapid changes in velocity ratios, and can take advantage of engine drag.

Further, conventional non-circular gears employ standard involute-shaped gear teeth. Although the involute-shaped gear teeth are acceptable for use with circular gears, involute-shaped gear teeth when used on non-circular gears cause the contact ratio between the gears to continuously vary. These variations in contact ratio cause excessive gear noise. Also, the contact ratio of involute-shaped teeth even on circular gears rarely reaches 2.0. Consequently, the load which can be carried by the gears is limited. Although the contact ratio may be increased by twisting the gear teeth, twisted gear teeth produce point contact which creates Hertzian stress. Accordingly, there also remains a need for non-circular gears having a constant contact ratio which is preferably at least 2.0.

SUMMARY OF THE INVENTION

According to the invention, there is provided an infinitely-variable transmission which addresses the deficiencies of the prior art.

The infinitely-variable transmission, according to the present invention, comprises a rotational input member, a rotational output member, a pair of variable velocity-ratio gear sets, a multi-directional coupling associated with the gear sets, and an actuator associated with the coupling. The coupling couples the gear sets to the rotational members over a common angular period so as to provide a uniform velocity ratio between the rotational members over the angular period. The transmission also includes a phase angle variator associated with at least one of the gear sets for varying a rotational angular displacement between the gear sets. Consequently, the velocity ratio of the transmission can be varied while maintaining the velocity ratio uniform over the angular period.

In a preferred embodiment of the invention, the transmission comprises a first and second non-circular driving gears coupled to one of the rotational members, and a plurality of variable velocity-ratio gear assemblies disposed about the one rotational member. The gear assemblies are coupled to the non-circular gears and the other of the rotational members for providing a uniform velocity ratio between the rotational members. Each gear assembly comprises an intermediate shaft including first and second non-circular driven gears meshing respectively with the first and second non-circular driving gears. Preferably, the velocity ratio of each variable-ratio pair of first driven/driving gears and the velocity ratio of each variable-ratio pair of second driven/driving gears includes a constant acceleration portion.

Each gear assembly also comprises a multi-directional coupling associated with the respective first and second variable-ratio gear pairs, and an actuator associated with the coupling for coupling the respective variable-ratio gear pairs to the rotational members. Preferably, the variable-ratio gears of each gear assembly are coupled to the rotational members over an angular period when the velocity ratios of both the first and second variable-ratio gear pairs of the respective gear assembly are changing linearly so as to provide a uniform velocity ratio over that angular period. Outside this period, at least one of the respective variable-ratio gear pairs is uncoupled from the rotational members. Further, preferably the occurrences of these angular durations for each of the gear assemblies overlap or are at least coterminous so as to provide a continuously uniform velocity ratio between the rotational members.

The transmission also includes a phase angle variator associated with the variable-ratio gear pairs for varying the rotational angular displacement between the first gear pairs and the second gear pairs of each gear assembly so as to vary the velocity ratio of the transmission as needed.

Variable-ratio gear pairs having a constant contact ratio, and a method for defining teeth flanks for such gears for providing a constant contact ratio are also disclosed. In accordance with the method, tooth flanks for the constant contact ratio variable-ratio gears are defined by first determining a pitch locus for one of the non-circular gears. Then the pitch locus is segmented into pitch locus portions. An effective pitch circle locus for the pitch locus portions is then determined by projecting the pitch locus portions onto a centre line joining centres of the non-circular gears. An effective generating circle locus for the effective pitch circle locus is then determined, in accordance with a desired pressure angle between the non-circular gears. Finally, a locus of congruency for the gears is determined from the effective generating circle locus.

BRIEF DESCRIPTION OF THE DRAWINGS

The preferred embodiments of the invention will now be described, by way of example only, with reference to the drawings, in which:

FIGS. 1, and 1*a* to 1*f* depict certain prior art infinitely-variable transmissions;

FIGS. 2, and 2*a* to 2*h* depict certain infinitely-variable transmissions according to the present invention, showing the variable velocity-ratio gear set, the multi-directional coupling, and the shadow cam disc actuator;

FIGS. 4*a* to 4*c* depict a variation of the shadow cam disc actuator;

FIGS. 6, 6*a*, 6*b* depict further variations of the shadow cam disc actuator;

FIGS. 7, and 7*a* to 7*c* depict further variations of the shadow cam disc actuator, incorporating roller ball followers;

FIGS. 8, 8*a*, 9, 9*a*, 10 and 10*a* depict further variations of the shadow cam disc actuator shown in FIGS. 7, and 7*a* to 7*c*;

FIGS. 11, 11*a* to 11*b* depict the phase angle variator for use with the infinitely-variable-transmissions of the present invention;

FIGS. 12, 13, 13*a*, 13*b*, 14, 14*a*, 14*b* depict certain variations of the phase angle variator;

FIGS. 15, and 15*a* to 15*i* depict a preferred tooth flank shape for use as a part of the variable velocity-ratio gear set; and FIGS. 16, 16*a*, 16*b*, 17 depict certain preferred implementations of the infinitely-variable transmissions according to the present invention.

DETAILED DESCRIPTION OF THE PREFERRED EMBODIMENTS

Figure 1A:
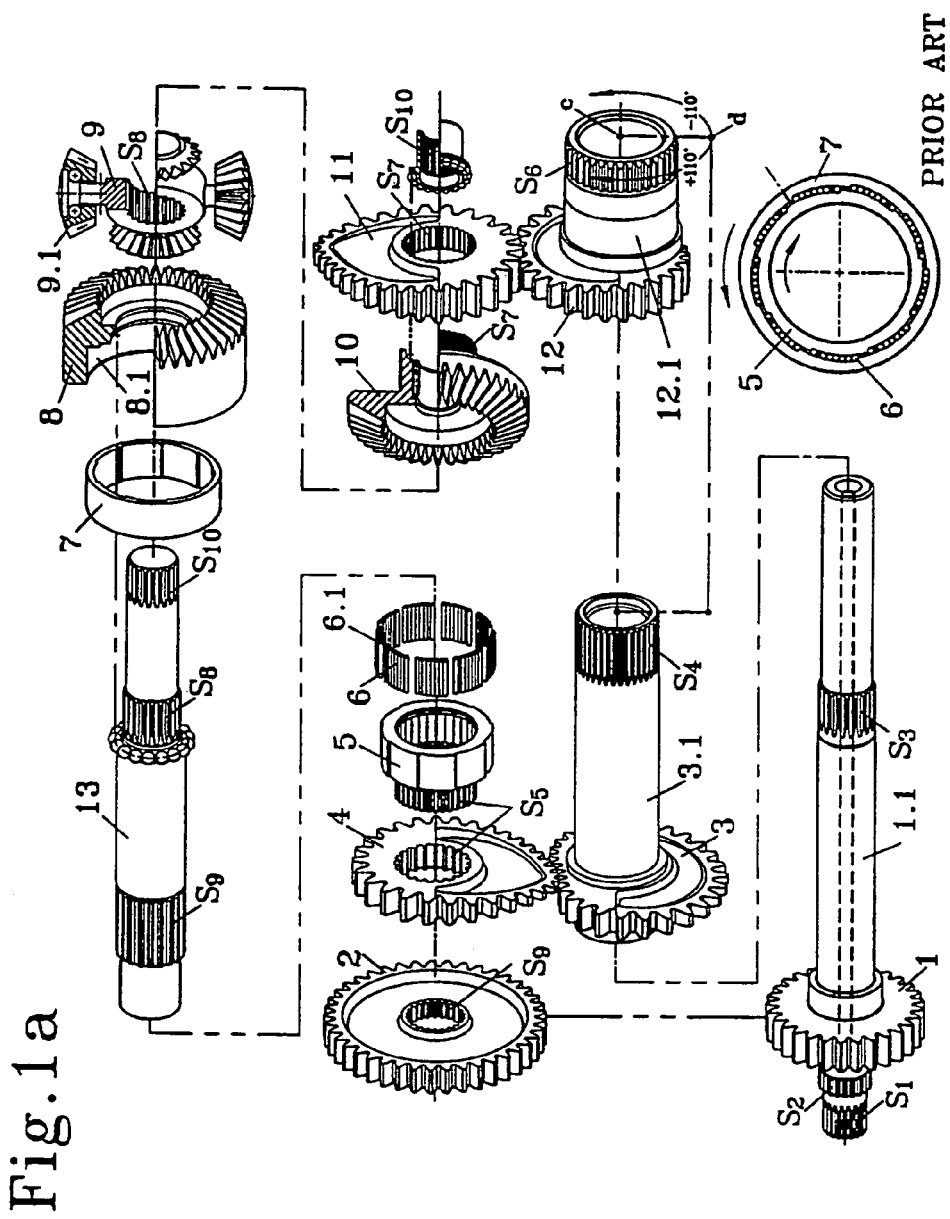
Figure 1B:
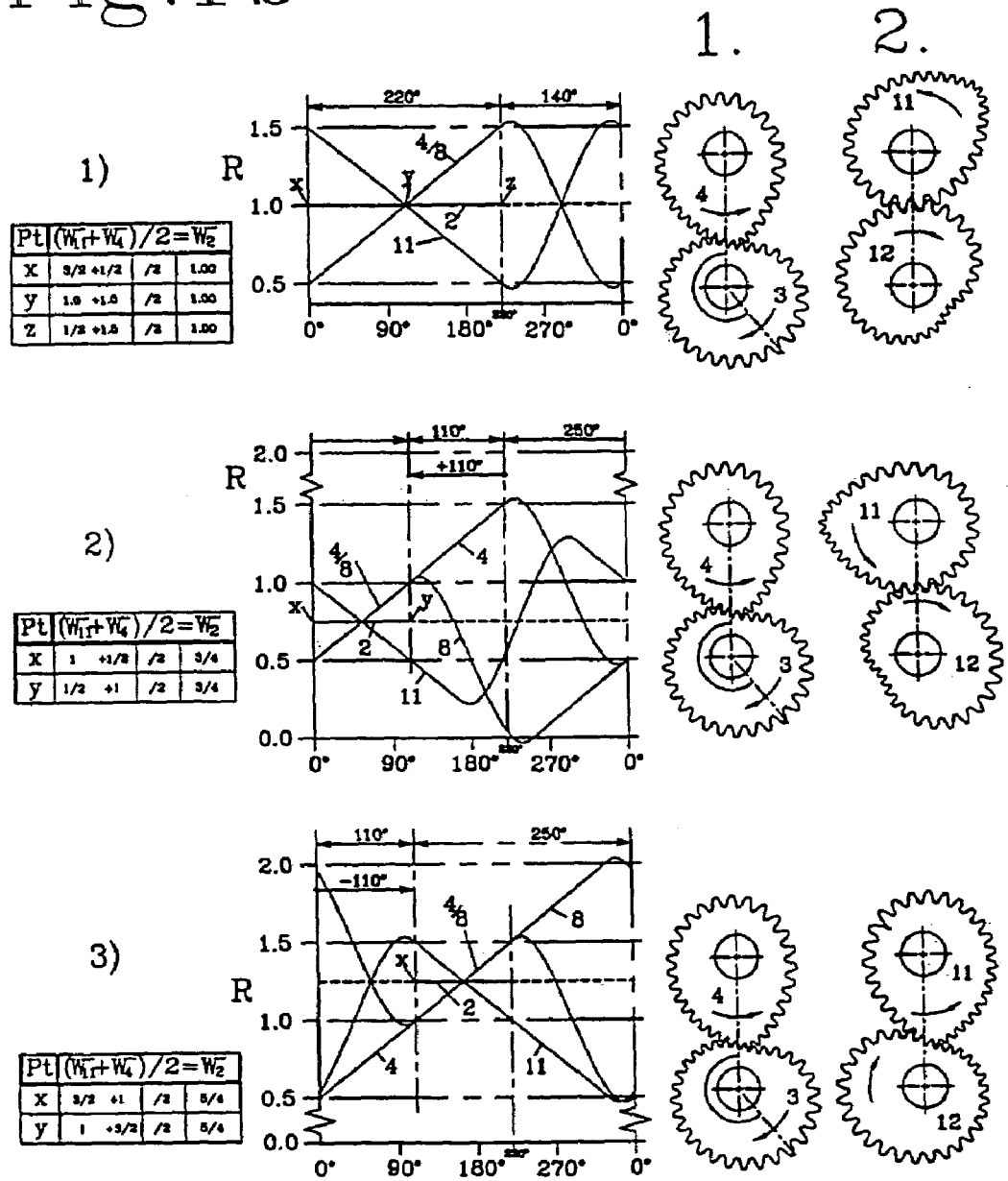
Figure 1D:
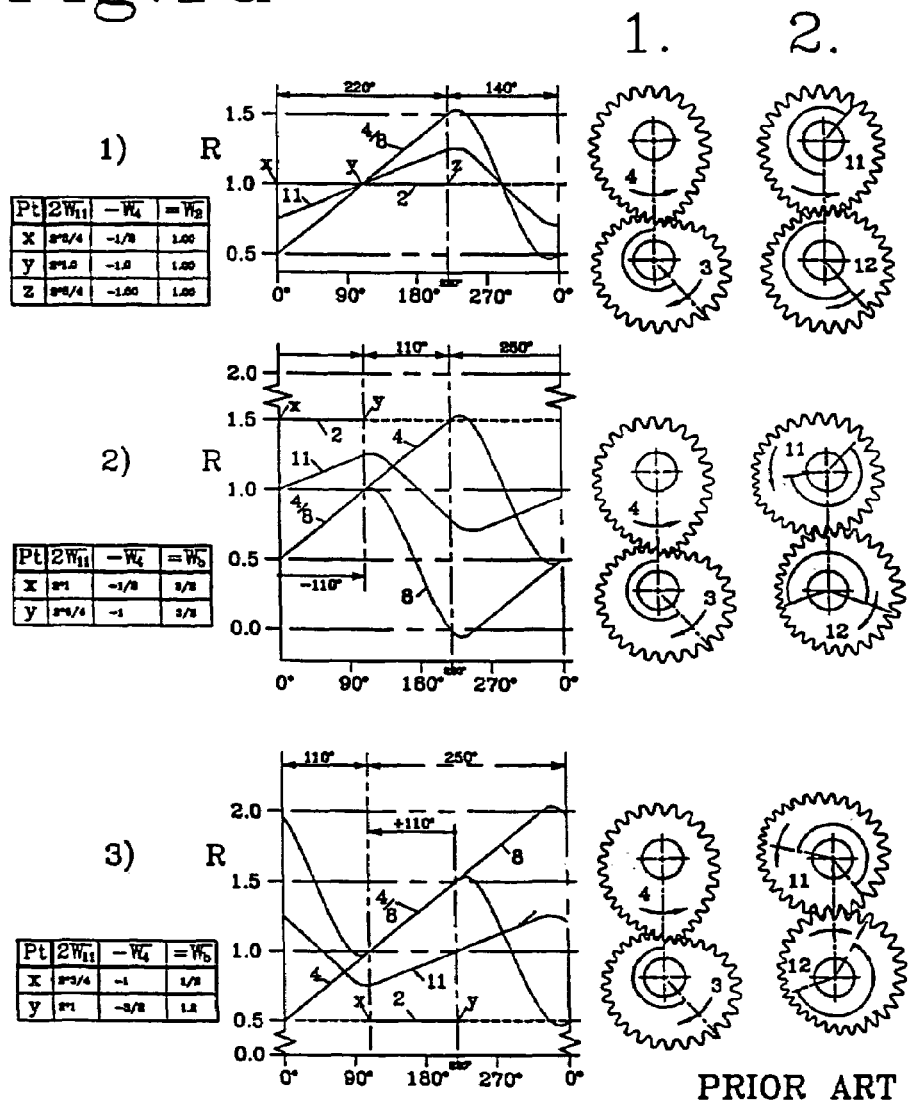

To assist in understanding the invention, certain prior art infinitely-variable transmissions will be described first, with reference to FIGS. 1a to 1f, followed by a discussion of one embodiment of the invention beginning with FIG. 2. FIGS. 1, 1a shows a partial layout of the components of a prior art infinitely-variable transmission. The transmission comprises an output gear 1 coupled to an output shaft 1.1, a first input shaft 3.1 including a first non-circular driver gear 3, and a second input shaft 12.1 rotatably coupled to the first input shaft 3.1 and including a second non-circular driver gear 12. The second non-circular gear 12 may be rotated angularly with respect to the first non-circular gear 1 by rotating the second input shaft 12.1 relative to the first input shaft 3.1 through a phase angle variator (not shown).

The prior art infinitely-variable transmission also includes four identical variable-ratio gear assemblies disposed at equal angular intervals around the input shaft 3.1 and the output shaft 1.1. For convenience. only one variable-ratio gear assembly is shown. Each variable-ratio gear assembly comprises an intermediate shaft 13, a first non-circular driven gear 4 rotatably disposed around the intermediate shaft 13 and meshing with the first non-circular driver gear 3, a second non-circular driven gear 11 rotatably disposed around the intermediate shaft 13 and meshing with the second non-circular driver gear 12, and a differential coupled to the first and second driven gears 4, 11 for combining the torque delivered to the output shaft 1.1 from the first and second gear sets. The differential includes a first bevel gear 8, a second bevel gear 10, and a cage 9 including pinions 9.1 meshing with the first and second bevel gears 8, 10. The cage 9 is coupled to the intermediate shaft 13, to which is splined a take-off gear 2. The take-off gear 2 itself is coupled to the output gear 1 and, therefore, the output shaft 1.1. The second bevel gear 10 is splined to be second driven gear 11, whereas the first bevel gear 8 is coupled to the first driven gear 4 through a one-way overrunning clutch. Consequently, the transmission shown in FIGS. 1, 1a is referred to as a "bevel-bevel" transmission.

The overrunning clutch comprises a tubular outer clutch slipper 7, and a tubular inner clutch body 5 provided within the clutch slipper 7 and being splined to the first non-circular driven gear 4. As shown in the breakout diagram of FIG. 1, the inner tubular surface of the clutch slipper 7 and the outer tubular surface of the clutch body 5 define a plurality of spiral channels in which are retained a plurality of clutch rollers 6. Consequently, the overrunning clutch will lock in one direction and will free-wheel in the opposite direction.

The operation of the prior art infinitely-variable transmission shown in FIG. 1 can be understood by referring to the diagrams shown in FIG. 1b. Diagram 1 of FIG. 1b shows the variation in velocity ratio $W_4$ of the pair of first non-circular gears 3,4, the variation in velocity ratio $W_{11}$ of the pair of second non-circular gears 12, 11, and the variation in velocity ratio R through the transmission over one revolution of the inputs shaft 3.1, 12.1 when the first non-circular gears 3,4 are in phase with the second non-circular gears 12, 11. As will be apparent, the velocity ratio of the first non-circular gears 3,4 increases linearly over the first 220° of input shaft rotation, and then decreases non-linearly over the subsequent 140° of input shaft rotation.

The velocity ratio R is given by the equation $R=(W_4+W_{11})/2$. Consequently, the velocity ratio of the second non-circular gears 12, 11 decreases linearly over the first 220° of input shaft rotation at the same rate as the velocity ratio of the first non-circular gears 3,4 increase during this interval to provide a constant velocity ratio R. The velocity ratio of the second non-circular gears 12, 11 increases over the subsequent 140° of input shaft rotation.

As shown in Diagram 1, the velocity ratio R does remain constant at 1.0 over the first 220° of input shaft rotation, as expected. Thereafter, the intermediate shaft 13 overruns the first bevel gear 8, causing the first and second non-circular gear pairs to become uncoupled from the input and output shafts. Consequently, after this point and until the input shafts return to their starting position, the variable-ratio gear assembly does not transfer any torque to the output shaft 1.1. However, each of the three other variable-ratio gear assemblies (not shown) will begin operating in sequence after each 90° of input shaft rotation. Consequently, the velocity ratio R of the transmission remains constant at 1.0 over the entire 360° revolution of the input shafts 3.1, 12.1.

Diagram 2 shows the variation in the velocity ratio $W_4$ of the pair of first non-circular gears 3,4, the variation in the velocity ratio $W_{11}$ of the pair of second non-circular gears 12, 11, and the variation in velocity ratio R through the transmission over one revolution of the input shafts 3.1, 12.1 when the second non-circular gears 12, 11 are advanced 110° relative to the first non-circular gears 3,4. With this phase angle, the velocity ratio R of the transmission drops to 0.75 for the period in which the overrunning clutch is locked. This interval coincides with the common interval in which the velocity ratios of the first and second non-circular gear pairs vary linearly so as to provide a constant velocity ratio R.

Diagram 3 shows the variation in velocity ratios of the pair of first non-circular gears 3,4 and the pair of second non-circular gears 12, 11, and the variation in velocity ratio R through the transmission over one revolution of the input shafts 3.1, 12.1 when the second non-circular gears 12, 11 are delayed 110° relative to the first non-circular gears 3,4, and the orientation of the overrunning clutch is reversed. With this phase angle, the velocity ratio R of the transmission increases to 1.25 for the interval in which the overrunning clutch is locked. Again, this interval coincides with the common interval in which the velocity ratios of the first and second non-circular gear pairs vary linearly so as to provide a constant velocity ratio R. Consequently, it will be seen that the amplification of the "bevel-bevel" transmission can change by 33% in one direction (between 110° and 0°), and 25% in the opposite direction (between 0° and −110°).

FIG. 1c shows another prior art infinitely-variable transmission, which is substantially identical to the transmission shown in FIGS. 1, 1a, except that the first non-circular gear 4 days splined to the intermediate shaft 13 and the cage 9, while the second bevel gear 10 is coupled to the take-off gear 2. Consequently, the transmission shown in FIG. 1c is referred to as a "bevel-carrier" transmission.

Diagrams 1, 2 and 3 of FIG. 1d show the variation in velocity ratio $W_4$ of the pair of first non-circular gears 3,4, the variation in velocity ratio $W_{11}$ of the pair of second non-circular gears 12, 11, and the variation in velocity ratio R through the transmission over one revolution of the inputs shaft 3.1, 12.1. As will be apparent, the velocity ratio of the first non-circular gears 3,4 increases linearly over the first 220° of input shaft rotation, and then decreases non-linearly over the subsequent 140° of input shaft rotation.

The velocity ratio R is given by the equation $R=2W_{11}-W_4$. Consequently, the velocity ratio of the second non-circular gears 12, 11 also increases linearly over the first 220° of input shaft rotation to provide a constant velocity ratio R over this interval. The velocity ratio of the second non-circular gears 12, 11 decreases over the subsequent 140° of input shaft rotation.

As shown in Diagram 1, the velocity ratio R does remain constant at 1.0 over the first 220° of input shaft rotation, as expected. Thereafter, the intermediate shaft 13 overruns the first bevel gear 8, causing the first and second non-circular gear pairs to become uncoupled from the input and output shafts.

The velocity ratios R for phase angles of +110° and –110° are shown in Diagrams 2 and 3, respectively, of FIG. 1d. From these diagrams it will be apparent that the interval in which the overrunning clutch is locked coincides with the common interval in which the velocity ratios of the first and second non-circular gear pairs vary linearly so as to provide a constant velocity ratio R. From these diagrams, it will also be apparent that the amplification of the "bevel carrier" transmission shown in FIG. 1c can change 50% in one direction and 100% in the opposite direction (with the orientation of the overrunning clutch reversed).

FIG. 1e shows another prior art infinitely-variable "bevel-carrier" transmission, which is substantially identical to the "bevel carrier" transmission shown in FIG. 1c, except that the differential has a gear ratio of 2:1. As shown in FIG. 1f, the amplification of the "bevel-carrier" transmission shown in FIG. 1e has changed 200% in one direction with infinite translation in the opposite direction (with the orientation of the overrunning clutch reversed).

Turning now to FIG. 2, 2a, one variable-ratio gear assembly of an infinitely-variable transmission 100, according to a first embodiment of the present convention, is shown. As above, the transmission 100 includes four identical variable-ratio gear assemblies which are disposed preferably at equal angular intervals around the input shaft 3.1 and the output shaft 1.1, although they may be disposed at unequal angular intervals with a possible reduction in performance. For convenience, only one variable-ratio gear assembly is shown.

The infinitely-variable transmission 100 comprises a "bevel-bevel"-type transmission, similar in structure to the infinitely-variable "bevel-bevel" transmission shown in FIG. 1, 1a. However, unlike the "bevel-bevel" transmission shown in FIG. 1, 1a, the cage 5 of the one-way overrunning clutch is replaced with a sleeve 5.1 provided around the intermediate shaft 13 and splined to the first non-circular driven gear 4. Also, each variable-ratio gear assembly of the transmission 100 includes a programmable multi-directional coupling and an actuator, in replacement of the one-way overrunning clutch.

The multi-directional coupling was described in published PCT Patent Application No. 98/01072, and comprises a travelling inner conical race 20 coupled to the sleeve 5.1 through a ball spline bx, a tubular outer clutch body 22 coupled to the first bevel gear 9.1, and a conical inner slipper 21 provided between the conical race 20 and the clutch body 22. The conical race 20 includes an outer conical friction surface, and the slipper 21 includes an inner conical friction surface which meets with the conical friction surface of the conical race 20. The slipper 21 includes an outer bearing surface, and the clutch body 22 includes an inner bearing surface which, together with the outer bearing surface of the slipper 21, defines a channel between the slipper 21 and the clutch body 22. The channel includes a plurality of pockets for retaining roller elements 6 therein, disposed in abutment against the bearing surfaces. Consequently when the conical race 20 is pressed axially inwards into the coupling while rotating relative to the clutch body 22, the outer friction surface of the race 20 engages in the inner friction surface of the slipper 21, causing the roller elements 6 to roll up their respective pockets and to press the slipper 21 inwardly against the conical race 20, thereby locking the conical race 20 to the clutch body 22 in both directions. Conversely, when the conical race 20 is pulled axially from the coupling, the roller elements 6 roll down their respective pockets causing the slipper 21 to retract from the conical race 20, thereby allowing the conical race 20 to rotate relative to the clutch body 22 in both directions.

The actuator serves to insert and withdraw the conical race 20 from the coupling, to thereby couple and uncouple the first non-circular gears 3,4 and the second non-circular gears 12, 11 to and from the input and output shafts. The actuator comprises a first shadow disc cam 16 coupled to the first input shaft 3.1, a second shadow disc cam 16b coupled to the second input shaft 12.1, a shadow cam follower plate 17 rotatably disposed around the sleeve 5.1 and including a plurality of apertures extending therethrough, a plurality of double-ended decoupling cone pins 19 disposed within the apertures, a stationary end ring 18 splined to the sleeve 5.1 provided between the first non-circular driven gear 4 and the shadow cam follower plate 17, a travelling end ring 24 splined to the sleeve 5.1 provided between one end of the conical race 20 and the shadow cam follower plate 17, and a spring s1 provided adjacent the opposite end of the conical race 20. The shadow disc cams 16, 16a rotate against the shadow cam follower plate 17, each including a cam lobe which is synchronized with the nonlinear portions of the velocity ratios of the respective non-circular gear pairs 3,4; 12,11.

As the cam lobe rotates against the cam follower plate 17, the cam follower plate 17 is pushed upwards by the cam lobe, causing the travelling end ring 24 to eject the conical race 20 from the multi-directional coupling and thereby uncouple the first bevel gear 8 from the first non-circular driven gear 4. After the cam lobe rotates away from the cam follower plate 17, the cam follower plate 17 moves downwards, causing the conical race 20 to be pressed into the coupling via the force exerted by the spring s1.

Subdiagrams a) and b) of FIG. 2b respectively depict the first non-circular gears 3, 4, and the corresponding shadow disc cam 16. Subdiagrams c) and d) of FIG. 2b respectively depict the second non-circular gears 12, 11, and the corresponding shadow disc cam 16a when the phase angle between the first and second non-circular gears is 0°, +110° and –110. Subdiagram e) of FIG. 2b shows that the common angular period during which both of the first and second non-circular gears are coupled to the input and output shafts coincides with the angular interval in which the acceleration of both the first and second non-circular gear pairs is constant. As discussed above, the requirement ensures that the velocity ratio R of the transmission remains constant over the period in which the first and second non-circular gear pairs are coupled to the input and output shafts. The interval during which the first and second non-circular gear pairs are uncoupled from the input and output shafts occurs when the acceleration of either or both of the first and second non-circular gears is nonuniform. Since the shadow disc cams 16, 16a are coupled to the input shafts 3.1, 12.1, this latter angular interval coincides with the non-linear portions of the pitch circles of the drive gears 3, 12. As will be discussed below, the angular interval in which the first and second non-circular gear pairs are uncoupled from the input and output shafts may also coincide with the non-linear portions of the pitch circles of the driven gears 4, 11.

The graph shown in FIG. 2b depicts the variation in velocity ratios of the pair of first non-circular gears 3,4 and the pair of second non-circular gears 12, 11, and the variation in velocity ratio R through the transmission 100 over one revolution of the inputs shaft 3.1, 12.1 when the second non-circular gears 12, 11 lead the first non-circular gears 3,4 by 110°, and lag the first non-circular gears 3,4 by 110°. As will be apparent, the velocity ratio R through the transmission 100 remains constant at 0.75 when the phase angle is +110°, and increases to 1.25 when the phase angle is −110°. Consequently, the amplification of the transmission 100 is 166%, which represents a dramatic improvement over the prior art. Further, as the multi-directional couplings can lock and free-wheel in both directions, the transmission 100 can take advantage of engine braking. Therefore, the output shaft 1.1 may act as a torque input member, with the input shafts 3.1, 12.1 acting as torque output members, if so desired. In this instance, the differential would act as a torque splitter which splits the input torque between the first non-circular gear pair and the second non-circular gear pair.

Figure 2D:
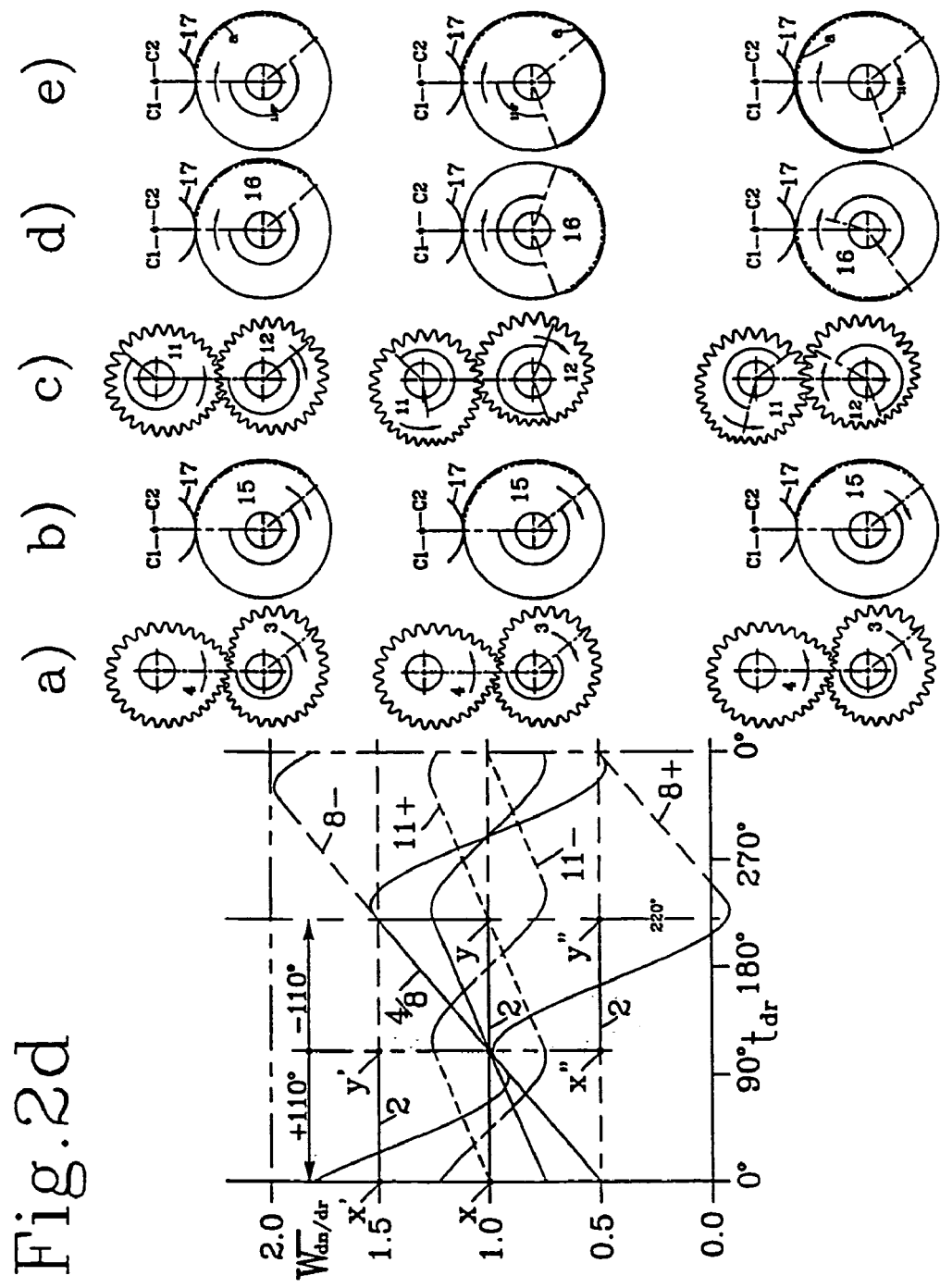

FIG. 2c shows an infinitely-variable "bevel-carrier" transmission 200, according to a second embodiment of the present convention. The infinitely-variable transmission 200 is substantially identical to the "bevel-carrier" transmission shown in FIG. 1c, except that the cage 5 of the one-way overrunning clutch is replaced with a sleeve 5.1 provided around the intermediate shaft 13 and splined to the first non-circular driven gear 4, and the one-way overrunning clutch is replaced with a programmable multi-directional coupling and an cam-follower actuator. As shown in FIG. 2d, the amplification of the transmission shown in FIG. 2c has a changed to 300% in both directions, which again represents a dramatic improvement over the prior art.

Figure 2E:
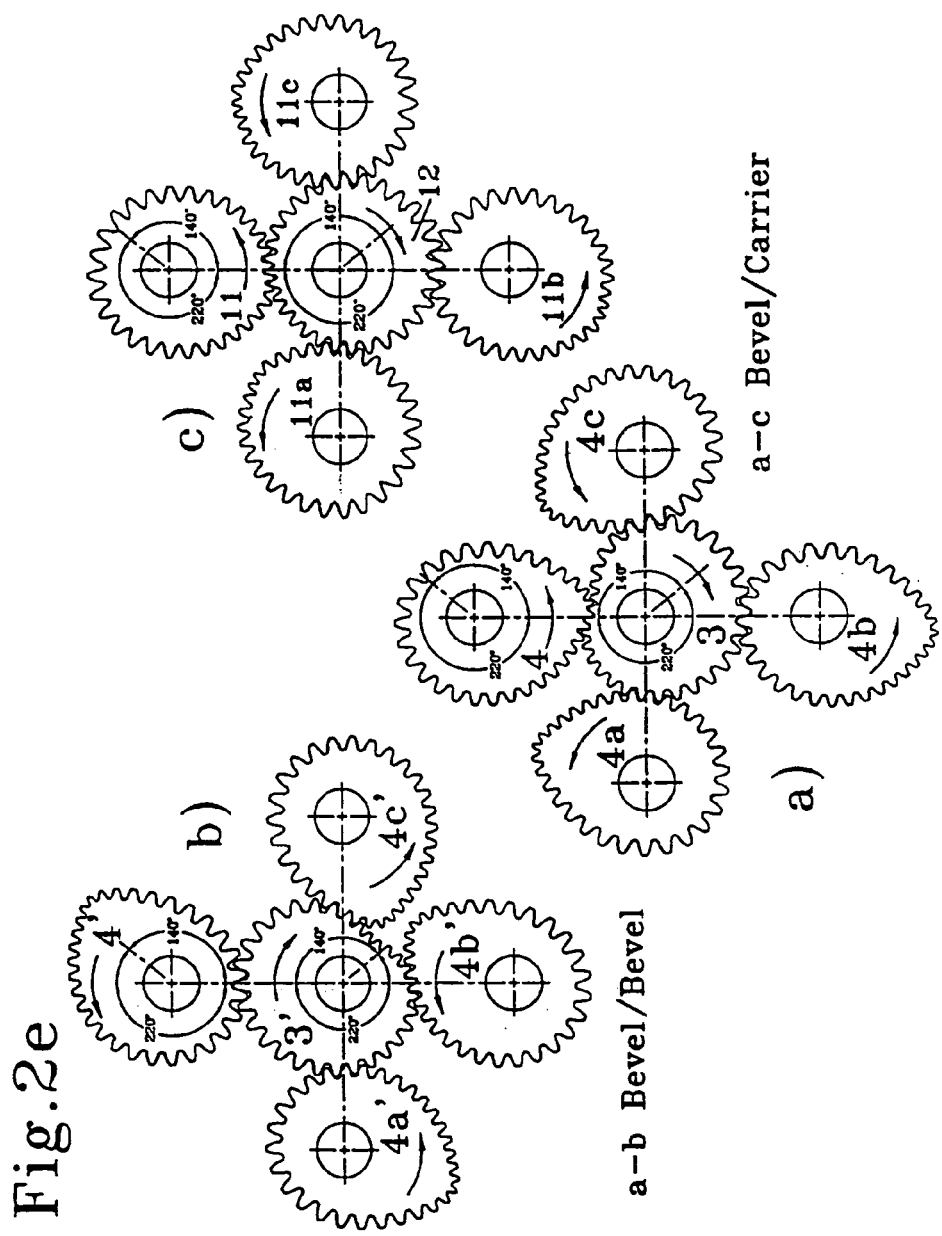

FIG. 2e summarizes the non-circular gear pairs for the "bevel-bevel" transmission 100. and the "bevel-carrier" transmission 200. Diagrams a) and b) of FIG. 2e depict the first and second non-circular gear pairs for the "bevel-bevel" transmission 100. The first non-circular gear pairs 3, 4 for the "bevel-bevel" transmission 100 are shown being of the same size as the second non-circular gear pairs 12, 11, except that the second non-circular gears 12, 11 are flipped over and rotated 180° to provide the velocity ratio profiles shown in FIG. 2b. Diagrams b) and c) of FIG. 2e depict the first and second non-circular gear pairs for the "bevel-carrier" transmission 200. The first non-circular gear pairs 3,4 for the "bevel-bevel" transmission 200 are oriented the same way as the second non-circular gear pairs 12.11, but produce twice the angular acceleration as the second non-circular gears 12, 11 to provide the velocity ratio profiles shown in FIG. 2b.

Figure 2F:
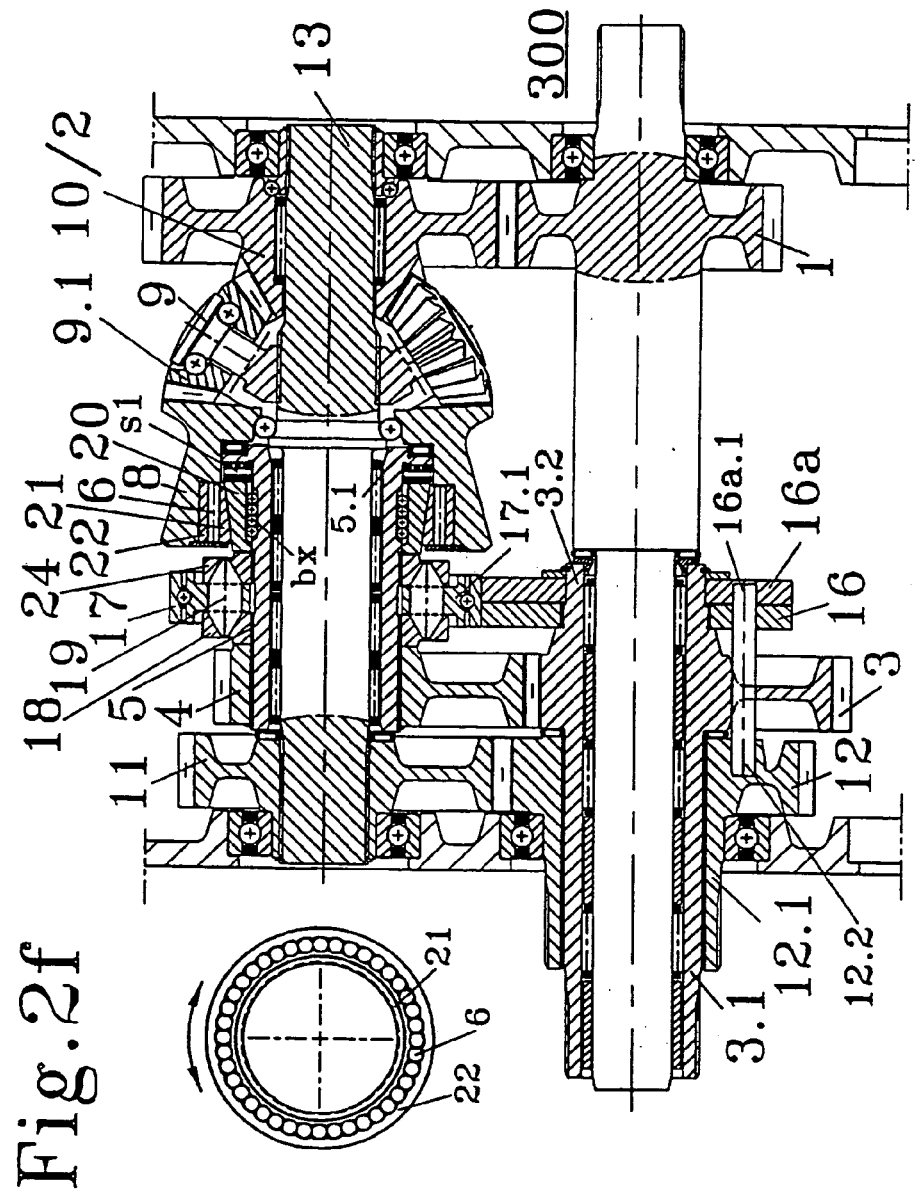

Numerous variations of the foregoing embodiments may be realized. FIG. 2f shows an infinitely-variable "bevel-carrier" transmission 300, according to a third embodiment of the invention. The "bevel-carrier" transmission 300 is substantially identical to the "bevel-carrier" transmission shown in FIG. 1e, except that the cage 5 of the one-way overrunning clutch is replaced with a sleeve 5.1 provided around the intermediate shaft 13 and splined to the first non-circular driven gear 4, and the one-way overrunning clutch is replaced with a programmable multi-directional coupling and an cam-follower actuator. Due to the 2:1 gear ratio of the differential, the first and second non-circular gear pairs can produce the same angular acceleration. The amplification characteristics of the transmission 300 are similar to those the transmission shown in FIG. 1e in so far as the transmission 300 is capable of producing infinite translation. As will be discussed below, this feature is advantageous when the transmission 300 is used in an automobile since it allows the output torque of the transmission 300 to drop to zero when the vehicle is stopped.

FIG. 2g shows an infinitely-variable "bevel-carrier" transmission 400 which is identical to the "bevel-carrier" transmission 200 shown in FIG. 2c, except that the differential is replaced with a planetary gear set comprising an annulus 8, a pinion 10, a cage 9 and a planet 9.1. With the annulus/pinion ratio set equal to the ratio of the first and second bevel gears 8, 10 of the differential, the amplification of the transmission 400 will be the same as that for the transmission 200.

FIG. 2h shows an infinitely-variable "bevel-carrier" transmission 500 which is substantially identical to the "bevel-carrier" transmission 400 shown in FIG. 2g, except that the differential is replaced with a coplanar reverted geartrain loop. The coplanar reverted geartrain loop was disclosed in published PCT Patent Application 98/01019, and comprises a pinion 10, an annular internal gear 8 disposed around the pinion 10 and being coaxial to the pinion 10, and a cage assembly 9 including a ring gear 9.1. The ring gear 9.1 includes an inner surface which engages the pinion 10, and an outer surface which engages the angular gear 8. The cage assembly 9 also includes an eccentric guide for disposing of a ring gear 9.1 coplanar to and eccentrically with respect to the pinion 10 and the angular gear 8. With the annulus/pinion ratio set equal to the ratio equal to 3/2, the amplification of the transmission 500 will be the same as that for the transmission 200.

Figure 3A:
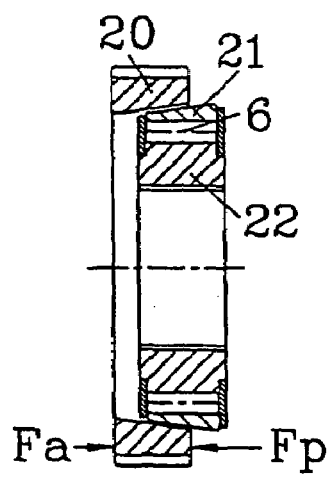
FIGS. 3*a* to 3*d* depict certain variations of the multi-directional coupling.
Figure 3B:
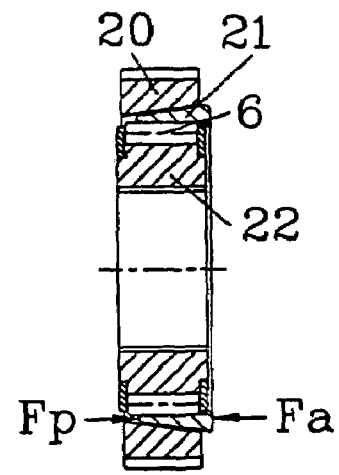
Figure 3C:
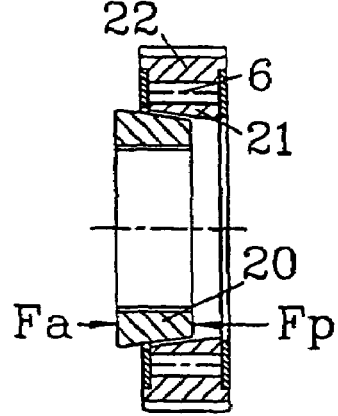
Figure 3D:
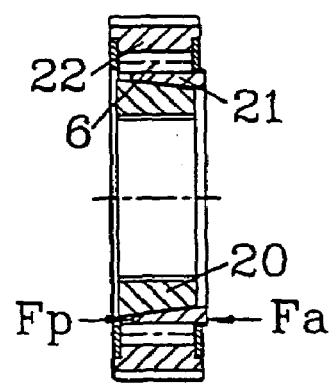

Thus far, all of the foregoing embodiments have employed a coupling including an inner conical race 20, as shown above and reproduced in FIG. 3c. However, the invention is not so limited. Rather, the coupling may include instead an outer conical race 20, a tubular inner clutch body 22, and a conical slipper 21 provided between the outer conical race 20 and the inner clutch body 22, as shown in FIGS. 3a, 3b. Alternately, rather than the actuator inserting and withdrawing the conical race 20 from the coupling, the actuator may instead insert and withdraw the slipper 21 from the coupling, as shown in FIGS. 3b. 3d. Numerous other variations of the coupling will be apparent to those skilled in the art.

Also, all of the actuators described thus far herein for coupling and uncoupling the first and second non-circular gear pairs to and from the input and output shafts have comprised shadow disc cams 16, 16a driving a plurality of double-ended decoupling cones 19. However, other actuator implementations are possible. One such implementation is shown in FIGS. 4a–4c, and comprises a pair of shadow disc cams 16, 16a coupled to respective input shafts 3.1, 12.1. an annular shadow cam follower plate 17 in abutment with the shadow disc cams 16, 16a, a decoupler disc 57 disposed within the cam follower plate 17 and including V-grooves provided on both end faces of the decoupler disc 57, and roller bearings b2 provided between the cam follower plate 17 and the decoupler disc 57 for allowing the cam follower plate 17 to rotate relative to the decoupler disc 57. The actuator also includes an axially-fixed annular cone race 56 provided between the first non-circular driven gear 4 and the shadow cam follower plate 17 and including an axial cone mating with the V-groove on one end face of the decoupler disc 57, and a travelling annular cone race 58 provided between the coupling and the shadow cam follower plate 17 and including an axial cone mating with the V-groove on the opposite end face of the decoupler disc 57. Also, the travelling annular cone race 58 includes an axially-extending conical flange opposite the axial cone portion thereof which is splined to the annular gear 8 through ball splines bx and replaces the conical race 20 of the coupling.

The actuator shown in FIGS. 4a–4c operates in a similar fashion to the actuators described above. As the cam lobe rotates against the cam follower plate 17, the cam follower plate 17 is pushed upwards by the cam lobe, causing the travelling cone race 58 to move laterally away from the cam follower plate 17, thereby uncoupling the annular gear 8 from the second non-circular driven gear 11. After the cam lobe rotates away from the cam follower plate 17, the cam follower plate 17 moves downwards, causing the travelling cone race 58 to move laterally towards the cam follower plate 17, thereby coupling the annular gear 8 to the second non-circular driven gear 11.

Figure 5A:
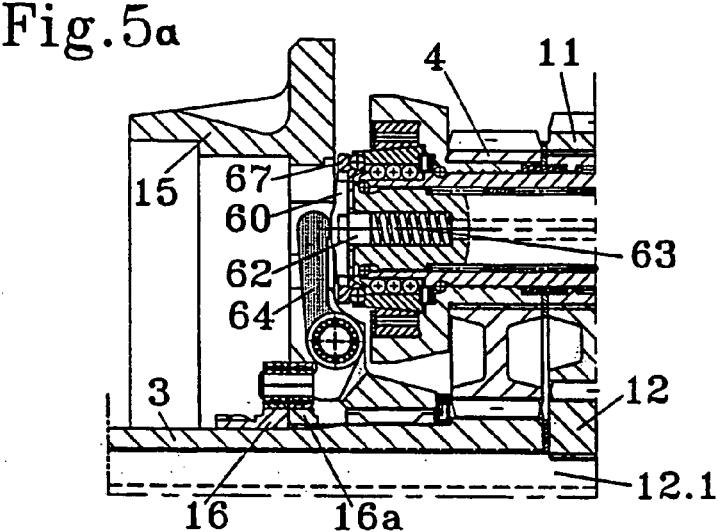
FIGS. 5*a*, 5*b* depict a variation of the shadow cam disc actuator, incorporating a rocker arm.
Figure 5B:
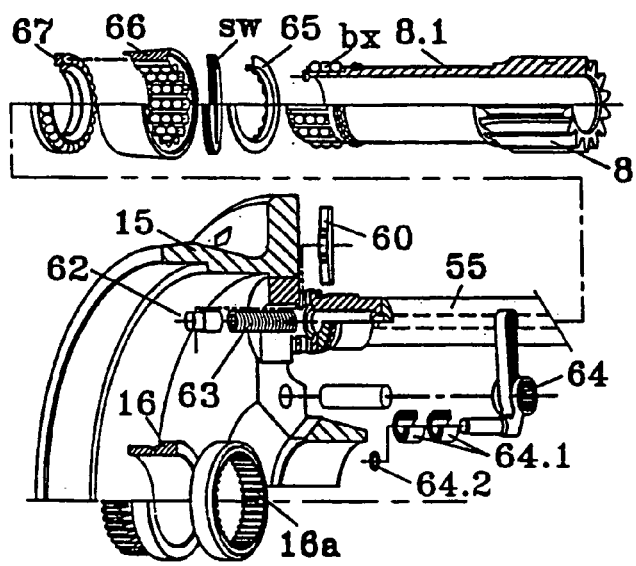

FIGS. 5a–5b depict another actuator implementation which replaces the cam follower plate 17 and the associated races 56, 58 with a rocker arm 64, a tappet 60 and coil spring 63. Whenever a cam lobe presses upwards against the rocker arm 64, the rocker arm 64 presses against the tappet 60 thereby forcing the conical slipper 20 out of the coupling. When the cam lobe moves away from the rocker arm 64, the spring 63 releases the pressure on the conical slipper 20 by the tappet 60, causing the conical slipper 20 to be drawn into the coupling. The advantage of this variation is that the rocker arm 64 provides a mechanical advantage which permits a shallower rise on the shadow disc cams.

FIGS. 6, 6a depict an actuator similar to the actuator shown in FIGS. 4a–4c, comprising a cam follower platen 68 disposed within the cam follower plate 17 and including V-grooves provided on one end face of the cam follower platen 68, and roller bearings provided between the cam follower plate 17 and the cam follower platen 68 for allowing the cam follower plate 17 to rotate relative to the cam follower platen 68. The actuator also comprises an axially-fixed bearing end plate 70 provided between the first non-circular driven gear 4 and the shadow cam follower plate 17 and including a key 69 for preventing rotation of the cam follower platen 68, and a travelling bearing end plate 71 provided between one end of the conical race 20 and the shadow cam follower plate 17 and including an axial cone mating with the V-groove on the cam follower platen 68.

The actuator shown in FIG. 6b is similar to the actuator shown in FIGS. 5a–5b, comprising a rocker arm 64' and a platen 68' which lie in the same plane as the cam followers 16a, 16b. Also, the cam follower plate 17 is eliminated in this variation. The platen 68' includes ribs for engaging the conical race 20. Whenever a cam lobe presses outwards against the rocker arm 64', the rocker arm 64' forces the platen 68' to move transversely to the axis of rotation of the intermediate shaft 13, thereby causing the ribs of the platen 68' to engage the conical slipper 20 and forcing the conical slipper 20 into the coupling. The advantage of this variation is that the actuator is not affected by centrifugal forces from rotation of the shadow disc cams.

All of the actuators described thus far herein have comprised shadow disc cams 16, 16a together with means for transferring the cam action of the shadow disc cams to the coupling, and have shadowed the non-linear portions of the pitch circles of the first and second driving gears 3, 12. FIGS. 7 to 10 depict actuators employing shadow bearing cams for coupling and uncoupling the first and second non-circular gear pairs to the input and output shafts, and which shadow the non-linear portions of the pitch circles of the first and second driven gears 4, 11. The actuator shown in FIGS. 7, 7b, 7c is shown being used in association with a "bevel-carrier" transmission which uses a coplanar reverted gear train loop 77 for transmitting torque between the first and second non-circular gear sets, and the input and output shafts. The annular gear is splined to the first driven gear 4, the pinion is splined to the second driven gear 11, and the cage assembly of the coplanar reverted gear train loop 77 is coupled to the output gear 2 through the coupling.

The actuator comprises a stationary platen cage 74 disposed around the intermediate shaft 13 and including a first and second thru-ports 74, 75, a first movable ball follower 88 provided within the first thru-port 74, and a second movable ball follower 88' provided within the second thru-port 75. The actuator also includes a first axial ball cam race 72 coupled to the first driven gear 4 and being in communication with the first thru-port 74, a second axial ball cam race 73 coupled to the second driven gear 12 and being in communication with the second thru-port 75, and an axial ball follower race 81 coupled to the conical slipper 20 of the coupling and being in communication with the thru-ports 74, 75. The axial ball cam races 72, 73 are concentric to each other. Also, each of the axial ball cam races 72, 73 includes a raised race portion which is synchronized with the non-linear portion of the pitch circle of the respective driven gear for uncoupling the first and second non-circular gears from the input and output shafts when the acceleration of either of the non-circular gear pairs is non-uniform. FIG. 7a depicts the raised race portions of the axial ball cam races 72, 73 for the respective non-circular gear pairs.

Figure 8:
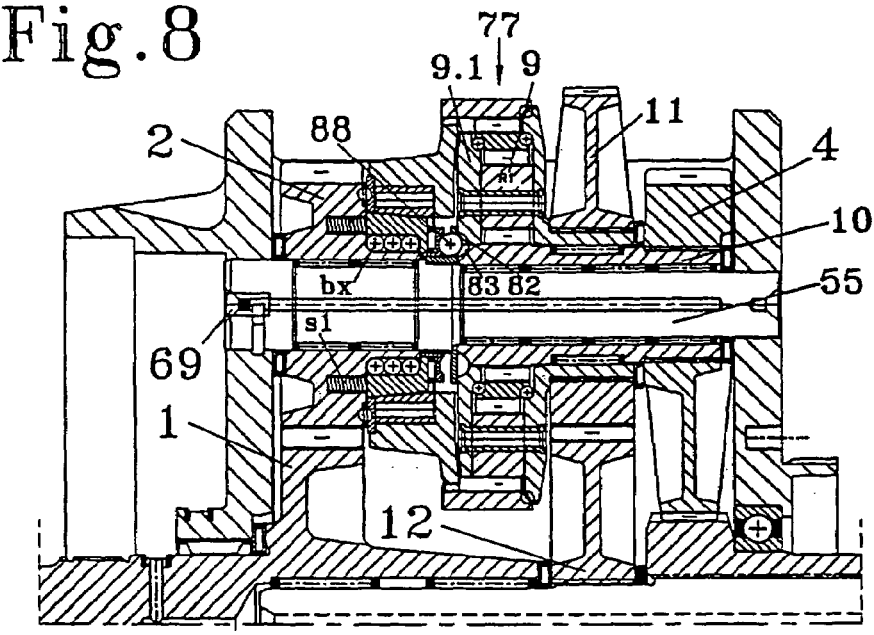
Figure 8A:
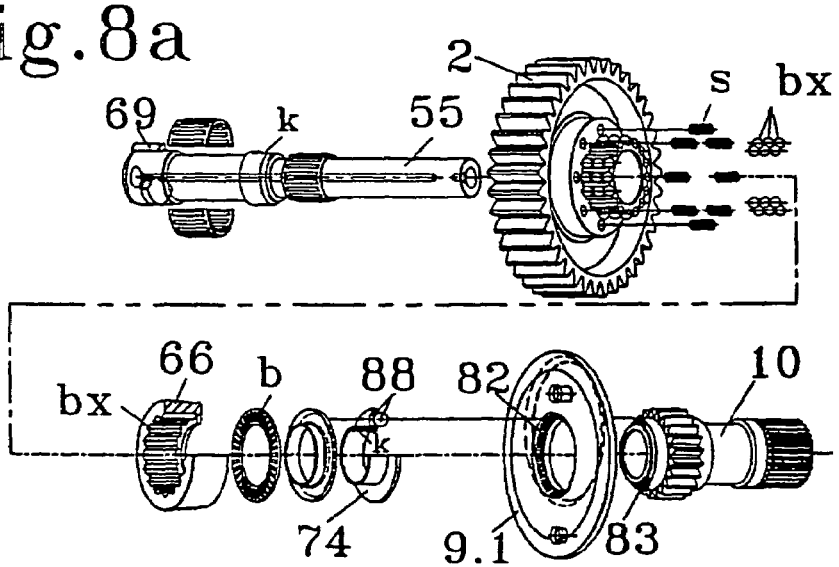

The actuator shown in FIGS. 8, 8a is shown being used in association with a "bevel-bevel" transmission which uses a coplanar reverted gear train loop 77 for transmitting torque between the first and second non-circular gear sets, and the input and output shafts. The pinion 10 of the coplanar reverted gear train loop 77 is rotatably disposed around a fixed countershaft 55 and is splined to the first driven gear 4. The cage assembly 9.1 is splined to the second driven gear 11. The annular gear is coupled to the output gear 2 through the coupling.

The actuator comprises a first bearing half-race 83 provided on a shoulder of the pinion 10, and a second bearing half-race 82 disposed adjacent the radially innermost shoulder of the cage assembly 9.1. The pinion 10 is rotatably disposed within the cage assembly 9.1 such that the first and second bearing half-races 82, 83 together comprise a full bearing race. The actuator also includes a single ball follower 88 provided within the full bearing race, and a stationary ball follower guide 74 provided between ball follower 88 and the conical race 20 of the coupling. Also, the first and second bearing half-races 82, 83 each include a raised race portion which is synchronized with the non-linear portion of the pitch circle of the respective driven gear for uncoupling the first and second non-circular gears from the input and output shafts when the acceleration of either of the non-circular gear pairs is non-uniform.

The actuator shown in FIGS. 9, 9a is similar to the actuator shown in FIG. 8, 8a. comprising a first bearing half-race 80 and a second bearing half-race 82 concentric with the first bearing half-race 80, both provided adjacent the radially innermost shoulder of the cage assembly 9.1. The actuator also comprises a ball cam riser 83 including a first riser half-race 83' and a second riser half-race 83" concentric with the first riser half-race 83'. The ball cam riser 83 is retained in a channel within the cage assembly 9.1, and includes a key which extends through the cage assembly 9.1 and engages a mating key on the second bevel gear 10 to allow the ball cam riser 89 to rotate with the second bevel gear 10. The first bearing half-race 80 and the first riser half-race 83' together comprise a first axial ball cam race. Similarly, the second bearing half-race 82 and the second riser half-race 83" together comprise a second axial ball cam race. The actuator also includes a stationary ball follower platen 74 including a pair of thru-ports for receiving a movable ball follower therein, and a follower ball race plate 81. The stationary ball follower platen 74 is keyed to the fixed countershaft 55. The follower ball race plate 81 is coupled to the outer conical slipper of the coupling, and includes a pair of ball follower races coinciding with the first and second axial ball cam races. Also, the first plate half-race 80 and the second riser half-race 83" each include a raised race portion which is synchronized with the non-linear portion of the pitch circle of the respective driven gear for uncoupling the driven gears 4, 11 from the input and output shafts when the acceleration of either of the non-circular gear pairs is non-uniform.

Figure 10:
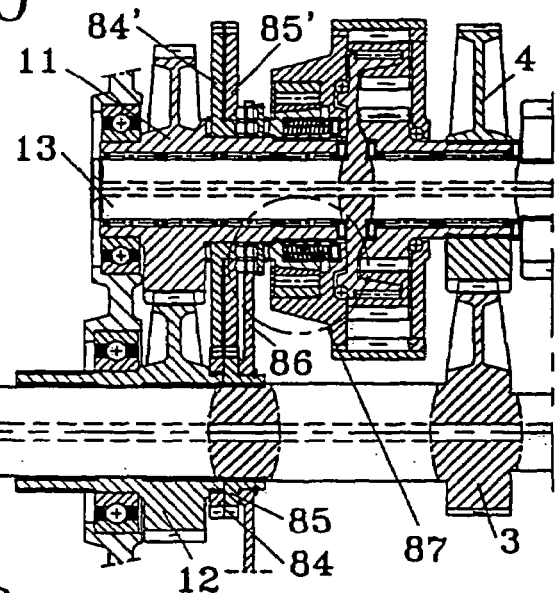
Figure 10A:
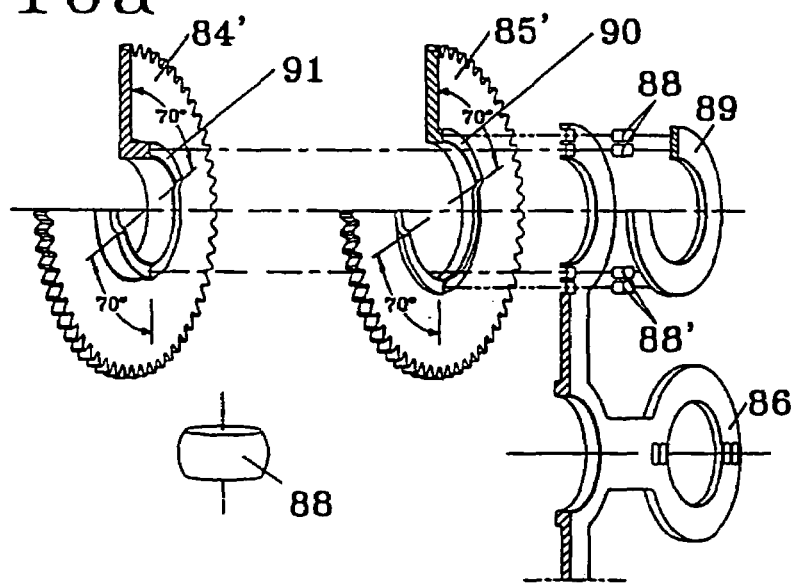

The actuator shown in FIGS. 10, 10a is shown being used in association with a "bevel-carrier" transmission which uses a coplanar reverted gear train loop for transmitting torque between the first and second non-circular gear sets, and the input and output shafts. The pinion of the coplanar reverted gear train loop is splined to the first driven gear 4. The cage assembly is fixed to the intermediate shaft 13. The annular gear is coupled to the second driven gear 11 through the coupling.

The actuator comprises a first centre axis gear 85 coupled to the first driving gear 3. a second centre axis gear 84 coupled to the second driving gear 12, a first intermediate gear 85' rotatably disposed around the intermediate shaft 13 and meshing with the first centre axis gear 85, a second intermediate gear 84' rotatably disposed around the intermediate shaft 13 and meshing with the second centre axis gear 84, and a ball follower guide 86 disposed around the intermediate axis 13 between the intermediate gears 84', 85' and the conical slipper of the coupling. The ball follower guide 86 includes a pair of apertures for receiving truncated ball followers 88 therein. Also, the first and second intermediate gears 84', 85' each include a respective axially-extending riser portion 91, 90 which is synchronized with the non-linear portion of the pitch circle of the respective driving gear for uncoupling the first and second non-circular gears from the input and output shafts when the acceleration of either of the non-circular gear pairs is non-uniform.

Figure 11:
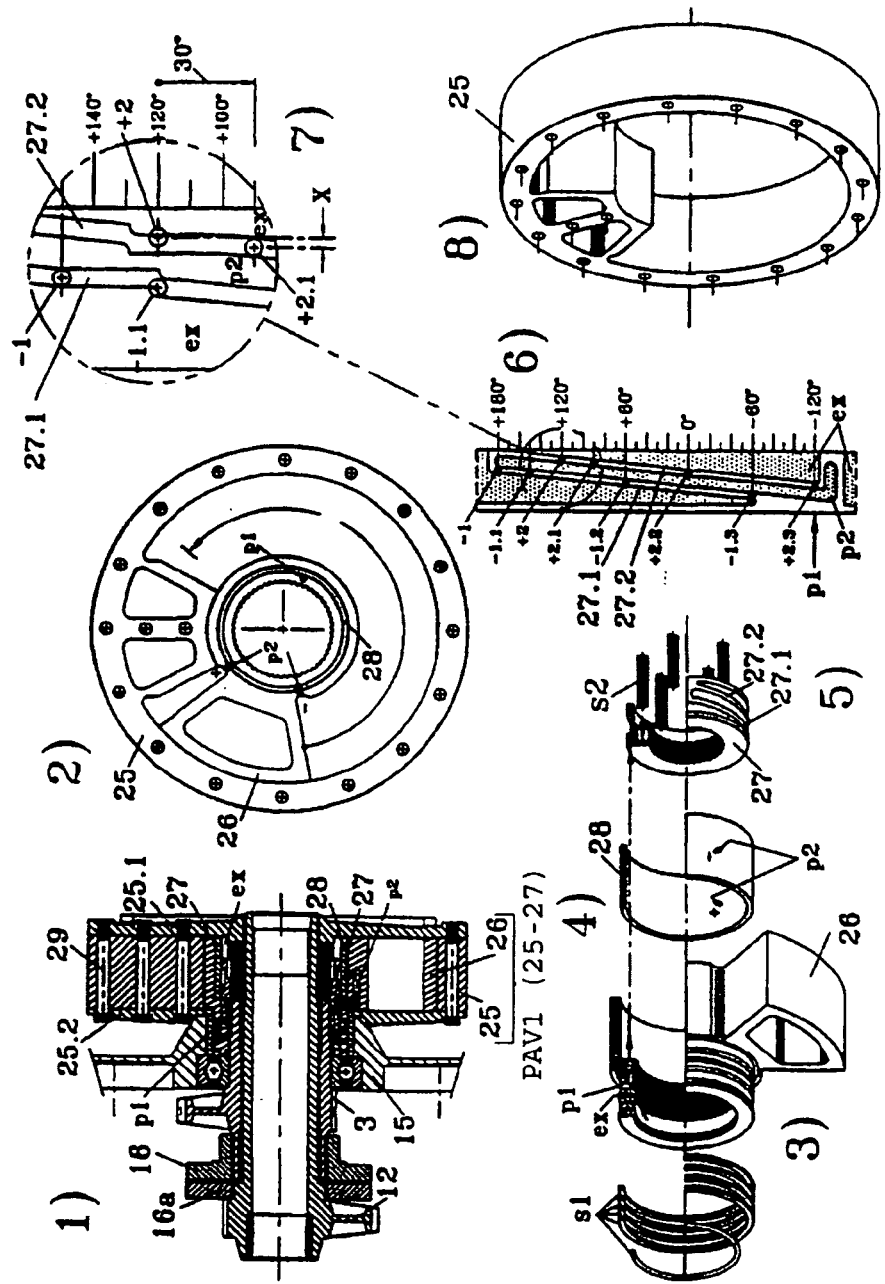

Having described various implementations of the variable ratio non-circular gear pairs, the multi-directional coupling and the actuator, an implementation of the phase angle variator for rotating the second non-circular gear pair 12, 11 relative to the first non-circular gear pair 3, 4 will now be discussed with reference to FIG. 11. The phase-angle variator shown in FIG. 11 is a hydraulically-operated variator, and comprises a stator 25 splined to the first input shaft 3.1, and a rotor 26 provided within the stator 25. The rotor 26 rotates about an axis which is eccentric to the centre of the stator 25, and includes a lobe extending radially outwards from the rotor body to the inner surface of the stator 25. The rotor 26 includes a cylindrical axial extension 26.1 splined to the second input shaft 12.1 incorporating an aperture p1 for receiving pressurized hydraulic fluid, and a sleeve 28 pressure fitted within the rotor 26. The phase angle variator also includes an oil spool 27 splined to the first input shaft 3.1 and being positioned inside the rotor 26 within the sleeve 28. The oil spool 27 includes a plurality of spiral fluid passageways provided between lands 27.1, 27.2 disposed around the circumference of the oil spool 27. The sleeve 28 includes fluid ingress and egress ports +, − for passing pressurized fluid p2 to and from the fluid passageways. The phase angle variator also includes a plurality of springs s2 provided against one end of the oil spool 27 for urging the oil spool 27 into the rotor 26.

In operation, pressurized hydraulic fluid is applied to the aperture p1 of the rotor 26, thereby urging the oil spool 27 to move axially relative to the rotor 26 in opposition to the force exerted on the oil spool 27 by the springs s2. As the oil spool 27 moves axially, the lands 27.1, 27.2 are displaced a distance from the fluid ingress and egress ports +, − thereby allowing fluid to enter the fluid passageways. The pressurized fluid in the fluid passageways causes the rotor 26 (and the first input shaft 3.1) to rotate relative to the second input shaft 12.1 until such time as the lands 27.1, 27.2 are rotated into a position which seals off the fluid ingress and egress ports +, −. As will be appreciated, the direction of rotation of the rotor 26 depends on the whether the pressurized fluid p2 is applied to the fluid port + or the fluid port Diagram 6 of FIG. 11 shows an "unrolled" oil spool 27, depicting the lands 27.1, 27.2, and shows the angular displacement of the oil spool 27 relative to the pressure of the hydraulic fluid at the port p1. As will be apparent, by controlling the pressure of the hydraulic fluid at the port p1, the phase angle between the first and second input shafts 3.1, 12.1 can be varied.

As discussed above, infinite translation is possible with the transmissions according to the present invention. For instance, the infinitely-variable "bevel-carrier" transmission 300 shown in FIG. 2f would have infinite translation when the phase angle is 110°. However, if the phase angle was not exactly 110°, and the transmission was fitted into an automobile, the automobile would be subject to creep. Diagram 7 of FIG. 11 shows a variation to the lands 27.1, 27.2 which is intended to prevent vehicle creep. The lands 27.1, 27.2 are modified by including respective non-spiral portions which are designed to seal off the fluid ingress and egress ports +, − when the phase angle is between approximately 90° and 120°. Consequently, within this angular range, the phase angle variator is disabled, and the reverse torque applied to the rotor 26 will cause the rotor 26 to rotate until the output of the transmission is zero.

FIG. 11a shows another hydraulically-operated variator, similar to the variator shown in FIG. 11, comprising a stator 25 splined to the first input shaft 3.1, and a rotor 26 provided within the stator 25 and being coupled to the second input shaft 12.1. However, unlike the variator shown in FIG. 11, the variator shown in FIG. 11a includes two lobes extending radially outwards from the rotor body to the inner surface of the stator 25 for defining four pressurization chambers around the rotor 26 to obtain greater torque on the rotor 26. Also, the variator includes a pinion 30, and the rotor 26 includes an annular gear 26.1 coaxial with the axis of rotation of the rotor 26 to obtain greater torque for rotation of the second input shaft 12.1. FIG. 11b shows another hydraulically-operated variator similar to the variator shown in FIG. 11a, except that the rotor 26 includes a cage assembly incorporating a ring gear 32 and an eccentric guide for meshing the outer gear surface of the ring gear 32 with the annular gear 26.1 and for meshing the inner gear surface of the ring gear 32 with the pinion 30. As will be apparent, the latter rotor structure resembles a coplanar reverted gear train loop, and eliminates the offset between the centre of the stator 25 and the axis of rotation of the rotor 26.

Figure 12:
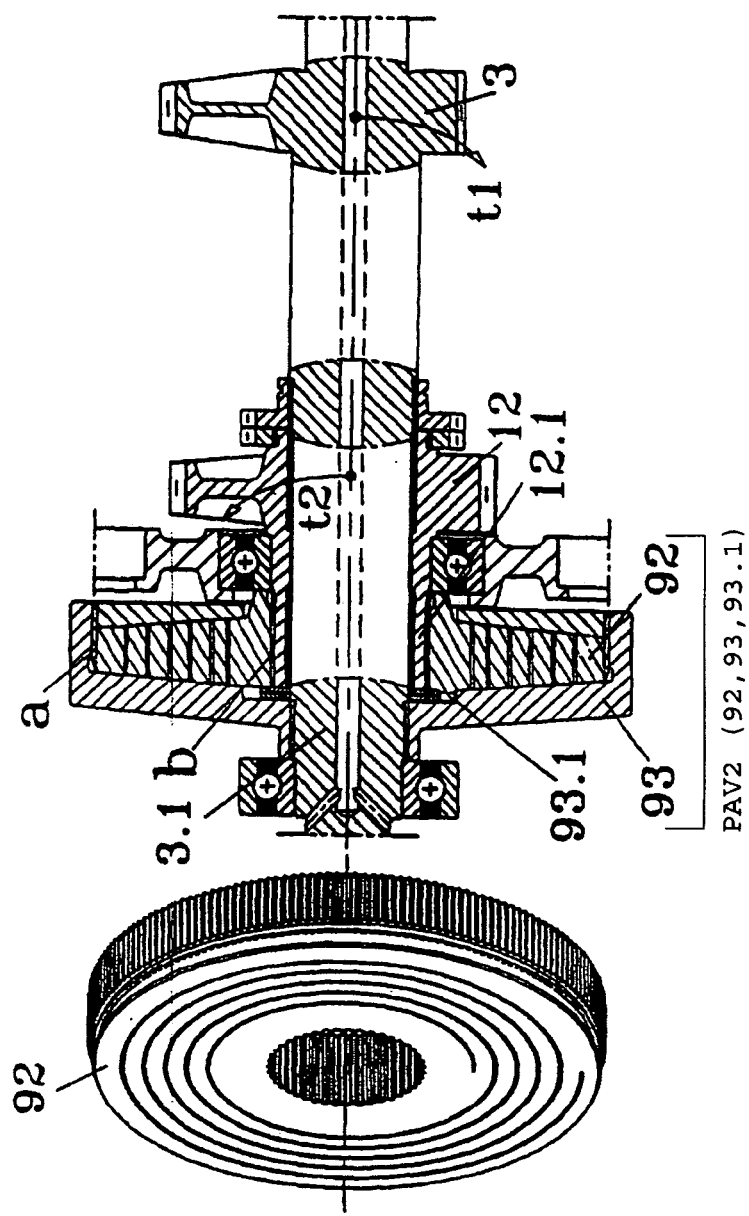

FIG. 12 shows a phase-angle variator which varies the phase angle between the first and second variable ratio gear pairs in accordance with the torque present at the output shaft 1.1. The variator comprises the first input shaft 3.1, the second input shaft 12.1, the first non-circular driven gear 3 splined to the first input shaft 3.1, and the second non-circular driven gear 12 splined to the second input shaft 12.1. The variator also includes a torsion spring housing 93 splined to the first input shaft 3.1, a torsion spring 92 disposed within the torsion spring housing 93 and being coupled between the first input shaft 3.1 at one end and the second input shaft 12.1 at the other end, and a stop 93.1 provided within the housing for limiting the magnitude of the phase angle between the first and second variable ratio gear pairs. In operation, with a prime mover rotating the first input shaft 3.1 with a torque t1, as shown in FIG. 12, and a load is applied to the output shaft 1.1, the second input shaft 12.1 will experience a reverse torque t2 which is proportional to the load applied. Consequently, the angle between the first and second variable ratio gear pairs will vary in accordance with the applied load and the spring constant of the torsion spring 92. As will be appreciated, as the applied load increase, preferably the second input shaft 12.1 rotates relative to the first input shaft 3.1 sufficiently so as to reduce the torque on the prime mover to an acceptable level.

It should also be pointed out that the width of the torsion spring housing 93 narrows with the radial distance from the input shafts. It is believed that this shape will bind the radially outermost portions of the torsion spring 92 to the torsion spring housing 93 so as to provide greater control over the phase angle.

Figure 13:
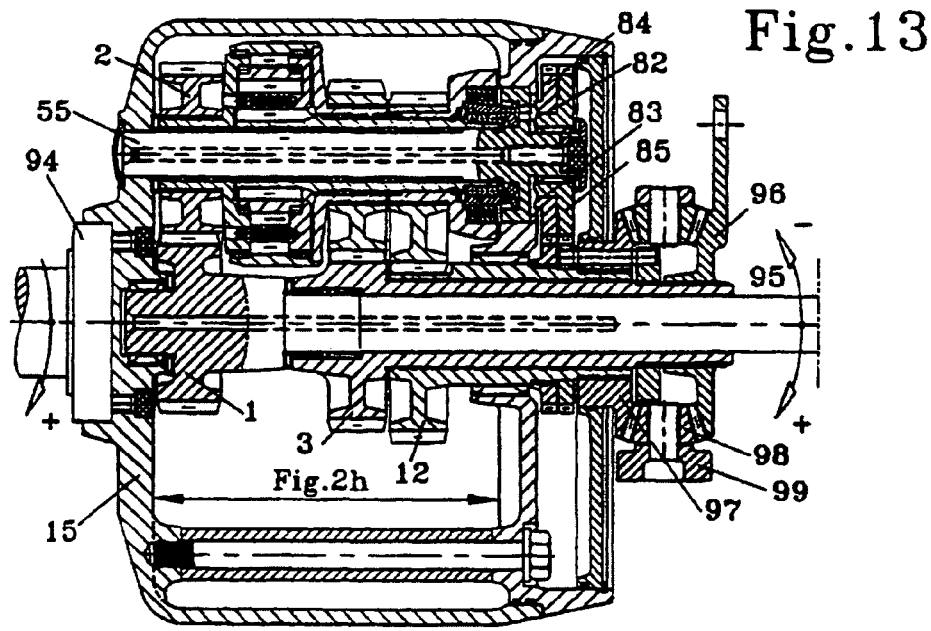
Figure 13A:
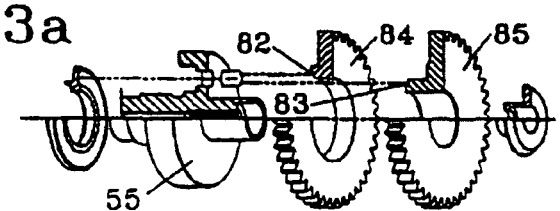
Figure 13B:
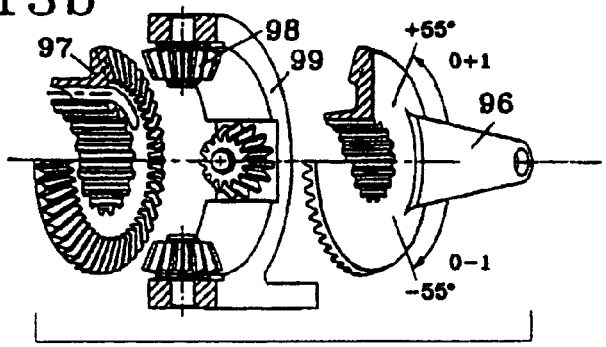

FIGS. 13, 13a, 13b show a manually-operated variator which is suitable for use on farm vehicles, such as tractors. The transmission shown in FIG. 13 includes the "bevel-carrier" variable-ratio gear assembly described with reference to FIG. 2h, and the actuator described with reference to FIG. 10. The variator comprises a variator differential, comprising a bevel gear control arm 96 splined to the first non-circular driving gear 3, a variator bevel gear 97 splined to the second non-circular driving gear 12, and a cage 99 including a plurality of pinions 98 meshing with the bevel gear control arm 96 and the variator bevel gear 97. As will be appreciated, by driving the first input shaft 3.1 with a prime mover, the velocity ratio of the transmission can be controlled by rotating the control arm 96. Preferably, the magnitude of the phase angle is limited to 110° to avoid undesirable fluctuations in rotational output speed.

FIG. 14 shows an all-gear variator comprising a first control gear a splined to the first driven gear 4, a second control gear b splined to the second driven gear 11, a cage assembly 807 rotatably disposed about the input shafts 3.1, 12.1, and a spool 808 provided within the cage assembly 807 and retaining a gear pair 809 rotatable thereon. The gear pair 809 includes a first spool gear b meshing with the first control gear a, and a second spool gear c fixed to the first spool gear b and meshing with the second control gear d.

The variator includes a band clutch provided between the cage assembly 807 and the casing 15 of the transmission which acts as a brake for selectively preventing rotation of the cage assembly 807 relative to the casing 15. The band clutch comprises a clutch stator 801, a clutch rotor 803 provided within the clutch stator 801, end plates 802a, 802b, and a clutch band 804 provided within the clutch rotor 803 and being coupled between the clutch rotor 803 at one end and the clutch end plates 802 at the opposite end. The variator also includes a variator end plate 801 splined to the second input shaft 12.1, and a cone coupling 806 and associated cone actuator 805 for selectively preventing rotation of the cage assembly 807 relative to the second input shaft 12.1.

As will be apparent from FIG. 14, the diameter of the first control gear a is greater than the diameter of the second control gear d. Consequently, if the brake is activated and the input shafts 3.1, 12.1 are rotating in the same direction, a torque will be developed at the spool 808 while will force the second input shaft 12.1 to rotate ahead of the first input shaft 3.1, thereby increasing the phase angle. On the other hand, if the brake is released, the torque at the spool 808 will cause the cage assembly 807 to rotate, thereby forcing the second input shaft to move back towards the first input shaft 3.1, thereby decreasing the phase angle. Once the desired phase angle is reached, the cone coupling 806 is activated and the brake is released (if not already released), thereby preventing further movement of the second input shaft 12.1 relative to the first input shaft 3.1.

Thus far, the foregoing discussion has assumed that the non-circular gears 3, 4, 11, 12 have used standard involute-shaped gear teeth. Although the such gear teeth would be acceptable for use in the infinitely-variable transmissions of the present invention, the variations in the pitch circle diameters would give rise to variations in contact ratio between the driving non-circular gears 3, 12 and the associated driven non-circular gear 4.11. Consequently the load which could be carried by the transmissions would be limited. Further, the variations in contact ratio would cause excessive gear noise. Therefore, it is desirable to have non-circular gears having constant contact ratio.

Figure 15:
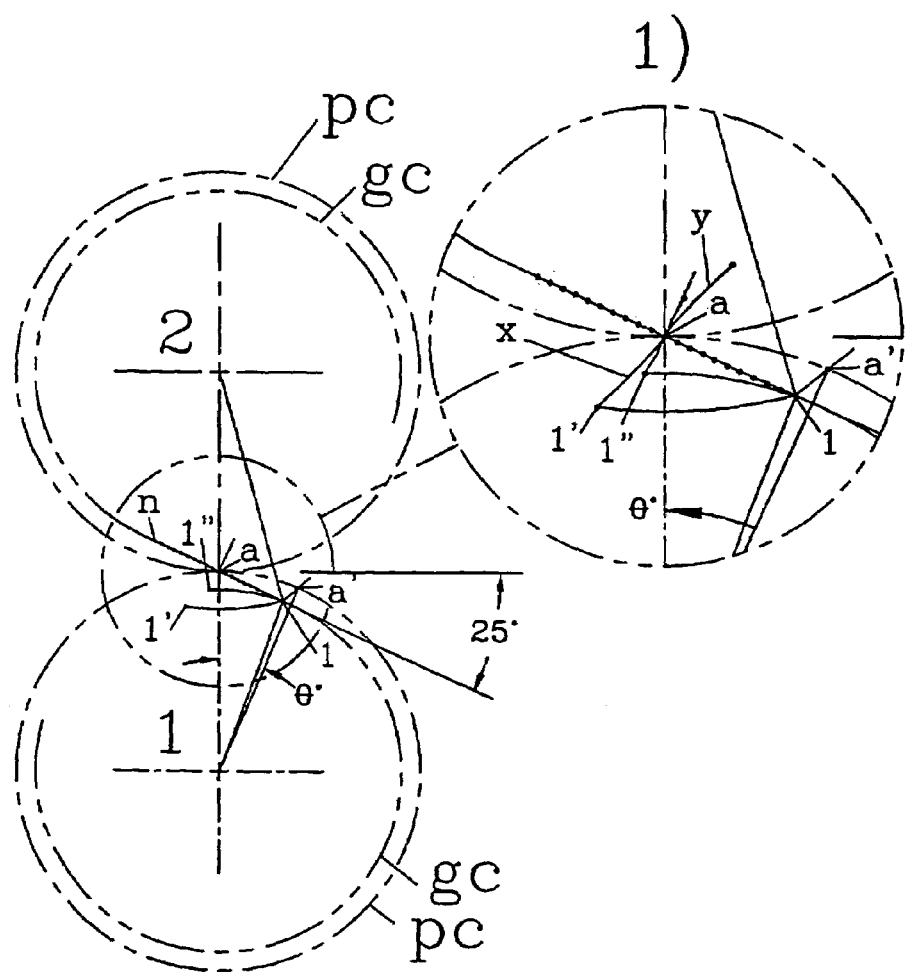

FIG. 15 depicts the conventional method for generating involute gear teeth on circular gears. First, a pitch circle pc is defined for each gear corresponding to the gear ratio of the gear pair. Then, a pressure angle is then selected, and a generating circle gc is constructed for each non-circular gear such that the line of action passes through the pitch point a of the pitch circles and is tangential to each pitch circle gc. Since the line of action represents a line of congruency, all points on the tooth flank must lie on the line of action as the tooth rotates towards the pitch point. Therefore, to determine the starting point on the tooth flank a line m is drawn tangential to the line of action and passing through the pitch point. This line m is then rotated about a line n tangential to the line m and passing through the respective centre of each gear until the pitch point intersects the corresponding pitch circle. This point of intersection is denoted as a'.

The point of intersection of the line m with the generating circle is denoted as 1. As shown in Drawing 1 of FIG. 15, angle θ denotes the angular displacement of the point a' relative to the pitch point a. The point 1 is then rotated about the respective gear centre towards the pitch point over the angle θ. The resulting point represents the starting point for the tooth flank, and is denoted in Diagram as 1" for gear 3 and 1' for gear 4. This process is then repeated for each point on the line of action between the starting points 1 for each gear, with the resulting locus defining the shape for each tooth flank. Example loci are denoted in Diagram 1 as x and y. However, this process is unsuitable for non-circular gear pairs since the pitch point a moves along the line between the gear centres as the gears rotate.

The following method has been developed for defining tooth flanks for non-circular gears while ensuring that the gears have a constant contact ratio. Although the following method is directed to non-circular gears when used in conjunction with infinitely-variable transmissions. it should be understood that the method is applicable to any set of gears in which a constant contact ratio is desired.

First, the pitch locus for the gears must be defined in accordance with the desired velocity ratio profile. FIG. 15a depicts the velocity ratio profile R for a first non-circular gear pair 3, 4 (shown in FIG. 15b for convenience). As will be apparent, the average velocity ratio of the gear pair 3, 4 is 1.0 since the non-circular gear 3 has the same size as the non-circular gear 4. However, the following discussion is also relevant to producing gears of unequal size.

From the velocity ratio profile shown in FIG. 15a, it is possible to obtain the polar coordinates for each point on the pitch locus for the driving gear 3. For instance, when the driving gear 3 has rotated 110°, the velocity ratio R is 1.0. Consequently, this point on the driving gear 3 will lie 50% of the distance between the centre of the driving gear 3 and the centre of the driven gear 4 and, therefore, will have as its polar coordinates 0.5∠110°.

Also, from this profile, it is possible to obtain the polar coordinates for each point on the pitch locus for the driven gear 4 by determining the area under the velocity ratio profile. For instance, the point on the driven gear 4 which will provide a velocity ratio R of 1.0 must also have a radius of 0.5 relative to the distance between the centre of the driving gear 3 and the centre of the driven gear 4. Since the velocity ratio of this point will start at 0.5 (at 0°) and increase linearly to 1.0 (at 110°), this point will have an average velocity ratio of 0.75 over 110°. Consequently, the angular displacement of this point will be 82.5° (75% of 110°), and its polar coordinates will be 0.5∠82.5°. The polar coordinates for the non-linear portion of the velocity ratio profile can be determined by integrating the equation for the velocity ratio profile over the angular interval of the non-linear portion. FIG. 15c depicts the polar coordinates for each point on the pitch locus for the non-circular gears 3, 4.

FIG. 15d depicts the velocity ratio profile R for a second non-circular gear pair 12, 11 (shown in FIG. 15e for convenience). As will be apparent, the second non-circular gears 12, 11 provide less acceleration than the first non-circular gears 3, 4. FIG. 15f depicts the polar coordinates for each point on the pitch locus for the non-circular gears 12, 11.

Figure 15G:
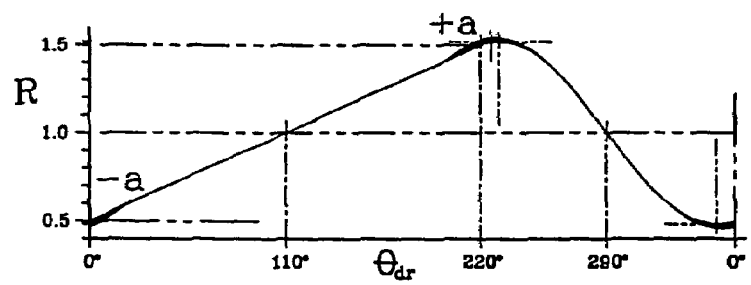

FIG. 15g depicts a variation of the velocity ratio profile R, shown in FIG. 15a, 15d, characterized by an upward irregularity in the rotation of a driven variable ratio gear near the end of a period of constant acceleration, or by a downward irregularity in the rotation of a driven variable ratio gear near the beginning of a period of constant acceleration, and/or vice versa. These irregularities are denoted by +a and −a in FIG. 15g. This variation provides a slight slackening off in torque during a coupling phase in a torque continuum, thereby facilitating uncoupling of an active programmable coupling and, therefore, transfer of torque between angularly-adjacent variable velocity-ratio gear sets.

Figure 15H:
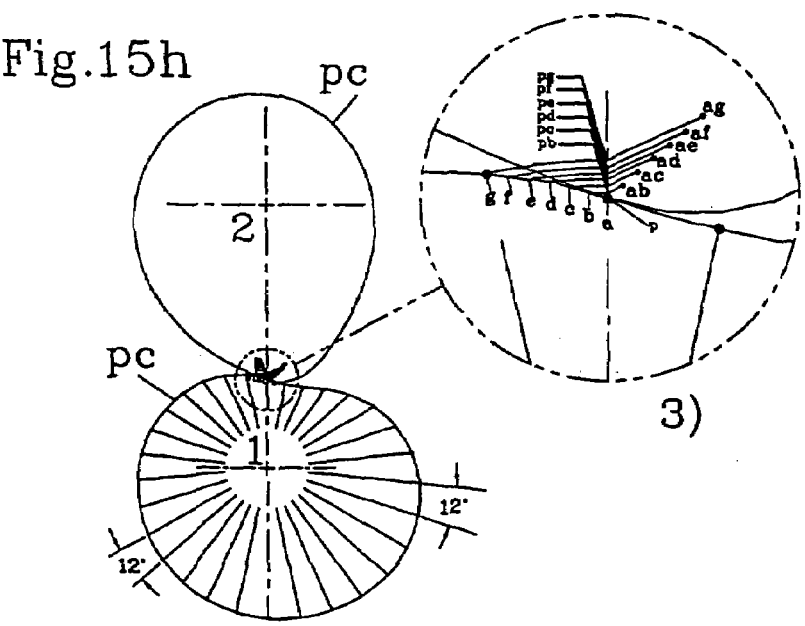

After the pitch locus for each non-circular gear has been defined, preferably the pitch locus is divided into equal angular segments corresponding to the number of teeth desired so that constant contact ratio is obtained. The pitch locus shown in FIG. 15h has been divided into 12° segments to provide 30 teeth on each non-circular gear. Then, a segment of the pitch locus is selected, and points are plotted along one half of the segment beginning with the point on the pitch locus which intersects the line joining the gear centres. In Diagram 1 of FIG. 15h, these locus points are denoted as a, b, c, d e, f, g. Each locus point a thru g is then projected back to the line joining the centres of the gears, thereby defining the effective pitch point for each pitch locus point. The effective pitch points are denoted as pb, pc, pd, pe, pf, pg in Diagram 1.

Once the effective pitch points are defined for the pitch locus points, an effective line of action is created for each locus point, passing through the effective pitch point. Since all the locus points are designed to lie on the actual line of action of the gears, the effective lines of action are drawn parallel to each other and inclined with the same angle as the actual line of action. In Diagram 1 of FIG. 15h, the line of action is 25°, as in the case of the circular gear set of FIG. 15. Then, each pitch locus point is projected back along the respective effective line of action to locate an effective generating circle point. The distance between the effective generating circle point to the respective effective pitch point is equal to the arc length between the respective pitch locus point and the line joining the gear centres. The effective generating circle points are denoted as ab, ac, ad, ae, af, ag in Diagram 1.

Figure 15I:
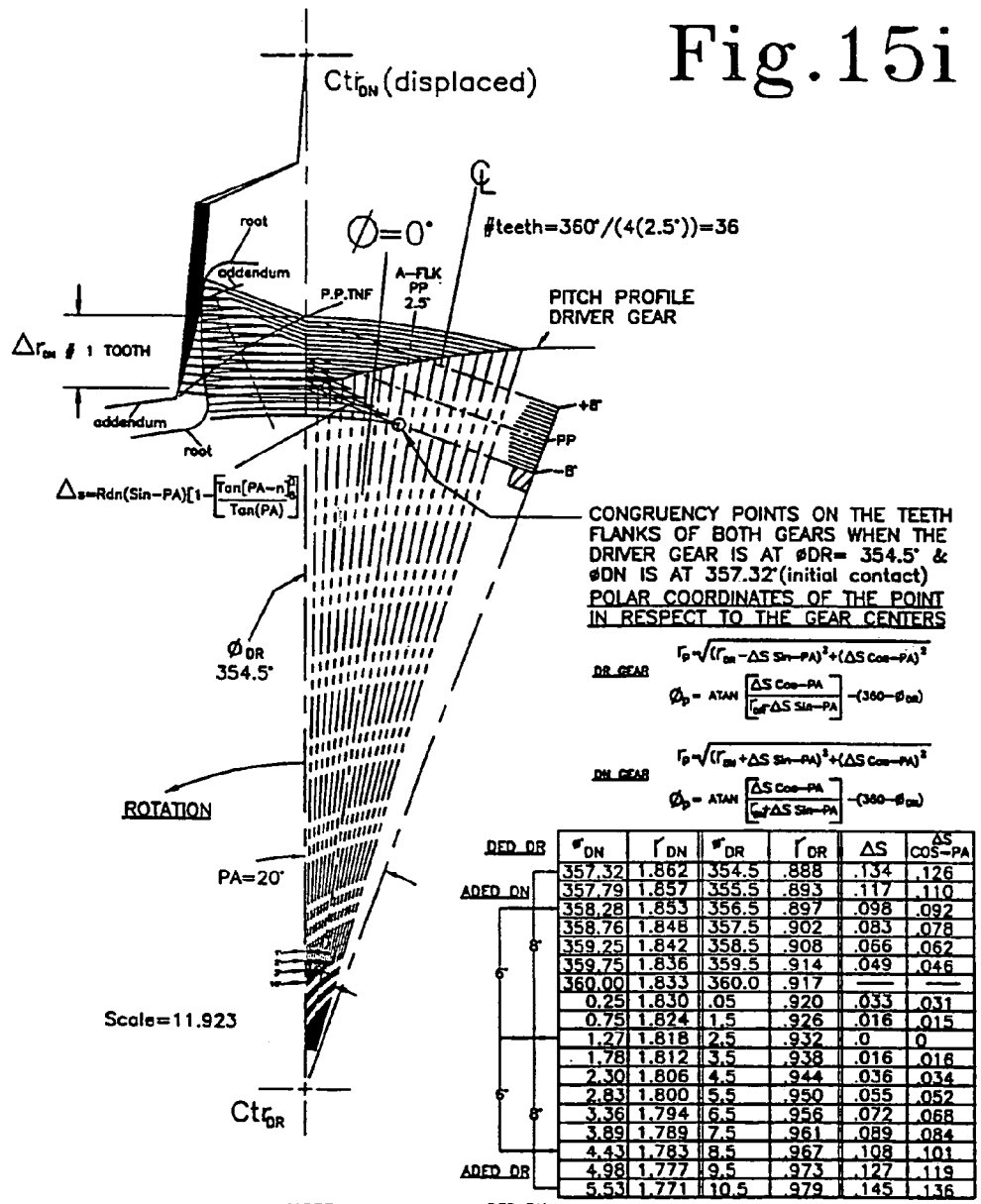

Finally, the shape of the tooth flank is defined by rotating each generating circle point over an angular interval θ equal to the angular interval between the respective pitch locus point and the line joining the gear centres. By rotating each generating circle point about the centre of each gear, the addendum of the tooth flank of one gear and the dedendum of the tooth flank of the opposite gear will be created. The process is then repeated for the locus points on the other half of the pitch locus segment. This method ensures that the tooth flank of one gear remains congruent with the tooth flank of the meshing gear over an angular span which is twice the angular interval between similar tooth flanks. Therefore, a contact ratio of at least 2.0 is attained. Alternately, as shown in FIG. 15i, the process may be conducted for the entire tooth flank in a single step by projecting each pitch locus point along the respective effective line of action a distance equal to half the arc length between the respective pitch locus point and the line joining the gear centres, and then rotating the effective generating circle points back by angular interval θ/2.

Having described several embodiments of the invention, a number of preferred transmission implementations incorporating these embodiments will now be briefly described. FIG. 16 depicts a transmission which incorporates the hydraulically-controlled variator described with reference to FIG. 11, 11a, 11b; the infinitely-variable "bevel-carrier" transmission 500; and Hi-Lo-Reverse gear box coupled to the output of the transmission 500.

Figure 16B:
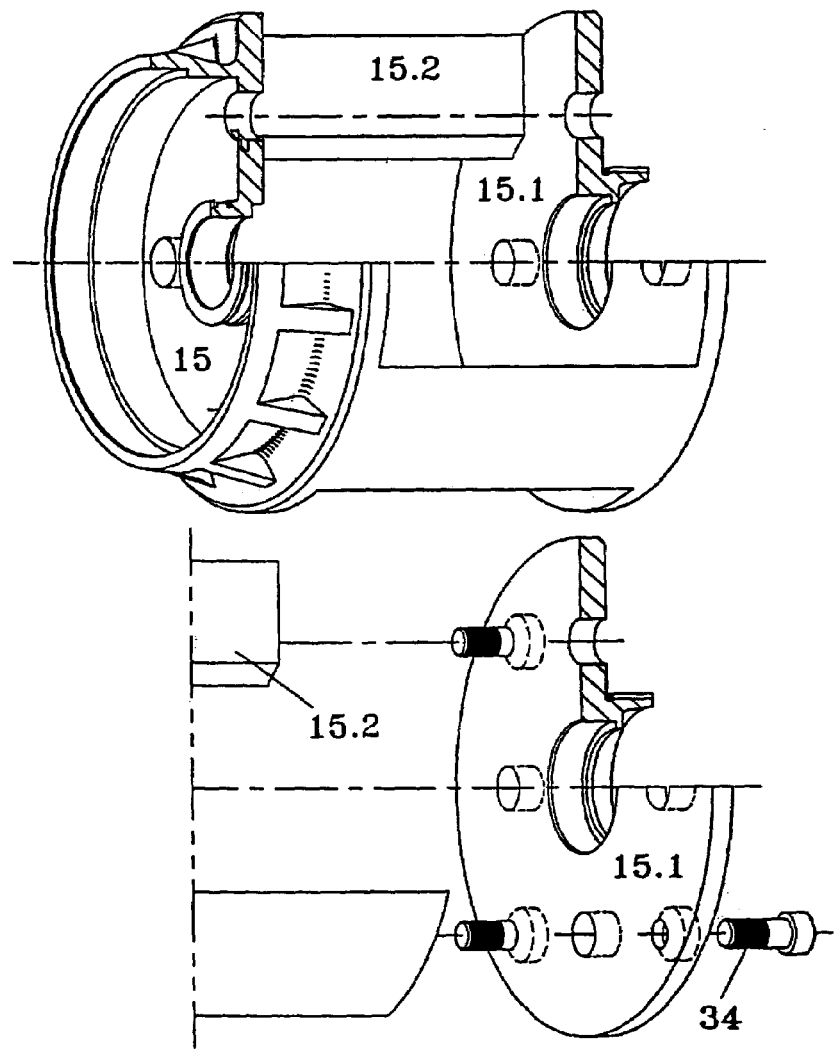

FIG. 16a depicts a transmission which is substantially similar to the transmission shown in FIG. 16, but including a spool release clutch assembly 35 which allows the casing 15 to rotate in unison with the input and output shafts when the velocity ratio of the transmission 500 reaches unity. The casing 15 is shown in more detail in FIG. 16b. This modification to the transmission shown in FIG. 16 is advantageous since the gears of the transmission 500 will function as a solid coupling when the velocity ratio reaches unity. Therefore, by coupling the casing 15 to the input and output shaft at unity velocity ratio reduces power loss at high speeds by effectively removing the transmission 500 from the torque continuum.

Figure 17:
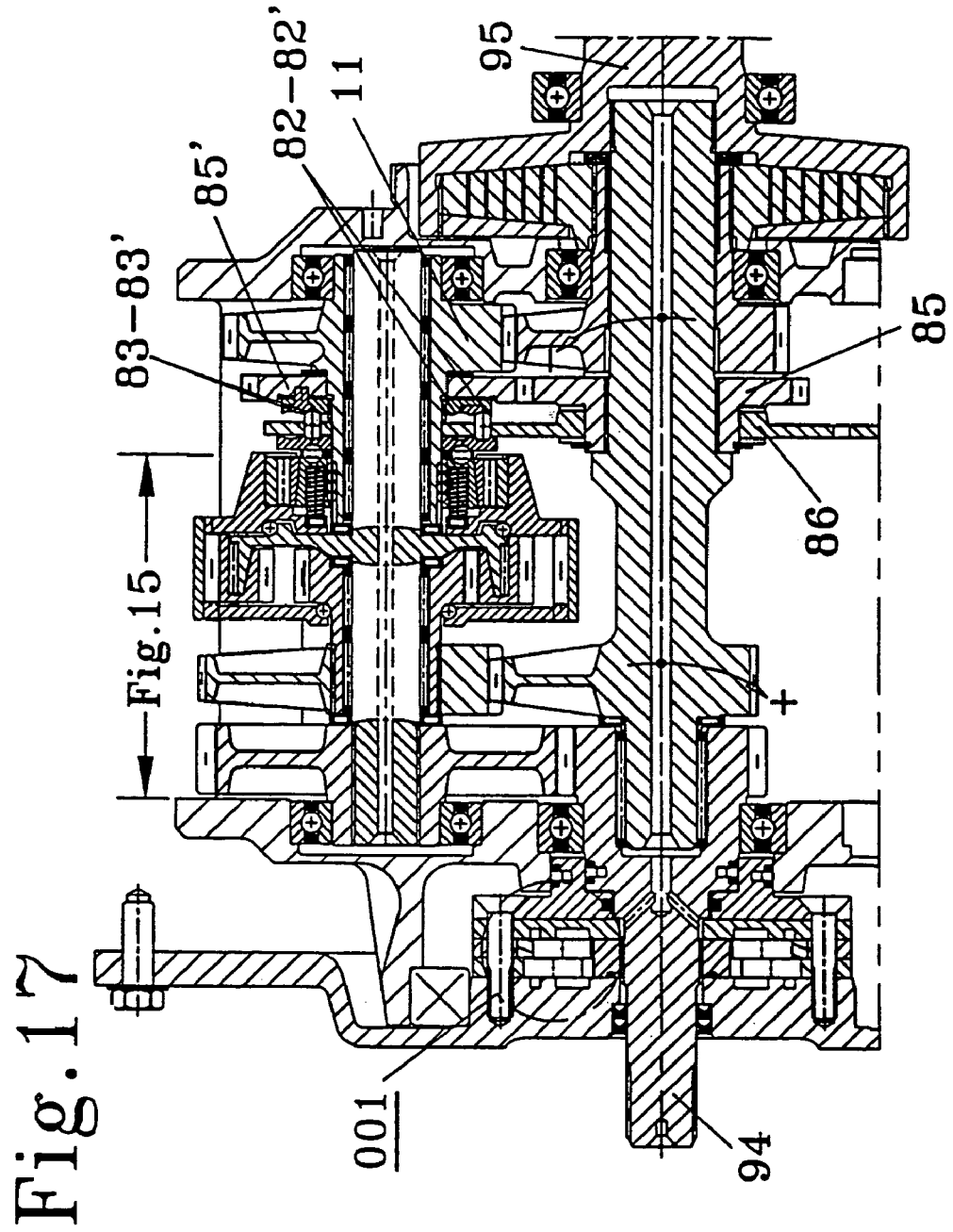

FIG. 17 depicts a transmission which incorporates an infinitely-variable transmission which amalgamates the features described with reference to FIGS. 9 and 10; the phase-angle variation described with reference to FIG. 12; and a 2:1 gear box coupled to the output of the infinitely-variable transmission so as to obtain gear ratios extending in infinitely-small increments from 1:1 to 4:1.

The foregoing embodiments are intended to be illustrative of the preferred embodiments of the invention. Those of ordinary skill may envisage certain additions, deletions or modifications to the foregoing embodiments which, although not specifically suggested herein, will not depart from the spirit or scope of the invention as defined by the appended claims.

I claim:

1. A transmission for transmitting power between a first driven gear (4) and a second driven gear (11), said transmission comprising:

a multi-directional coupling having an outer tubular clutch body (22) coupled to said second driven gear (11) for rotation therewith and an inner conical race (20) coupled to said first driven gear for rotation therewith and axially moveable relative to said outer tubular clutch body and between the first and second driven gears for selective engagement with said outer tubular clutch body; and an actuator for selectively moving said inner conical race axially into rotational locking engagement with said outer tubular clutch body to rotationally decouple the first and second driven gears, said actuator including a stationary end ring (18) fixedly coupled to the first driven gear, a traveling end ring (24) supported by said first driven gear and axially moveable between the first and second driven gears for axial engagement with said inner conical race, a shadow cam follower plate (17) disposed between said stationary end ring and said traveling end ring, and at least one decoupling cone pin (19) supported by said shadow cam follower plate for selectively engaging and axially moving said traveling end ring into engagement with said inner conical race to thereby displace said inner conical race from rotational engagement with said tubular clutch body and decouple the first driven gear from the second driven gear.

2. The transmission as set forth in claim 1 wherein said multi-direction coupling further includes a spring compressed between said second driven gear and said inner conical race for biasing said inner conical race into rotational engagement with said outer tubular clutch body and couple the first driven gear to the second driven gear.

3. The transmission as set forth in claim 2 wherein said inner conical race includes an outer conical friction surface and the outer clutch body 22 includes an inner conical friction surface for mating driving engagement with said outer conical friction surface of said inner conical race.

4. The transmission as set forth in claim 3 wherein said shadow cam follower plate includes a plurality of apertures for axially supporting a corresponding plurality of decoupling cone pins for axial engagement with said inner conical race.

5. The transmission as set forth in claim 4 wherein said actuator includes at least one shadow disc cam for engaging said shadow cam follower plate to displace said decoupling cone pins axially from said stationary end ring and force said traveling end ring to engage and axially displace said inner conical race from said outer clutch body to decouple the first and second driven gears.

* * * * *